US010966252B2

(12) United States Patent
Wu et al.

(10) Patent No.: US 10,966,252 B2
(45) Date of Patent: Mar. 30, 2021

(54) FAST-LOOP RESOURCE RESERVATION PROCEDURE

(71) Applicant: QUALCOMM Incorporated, San Diego, CA (US)

(72) Inventors: Zhibin Wu, Sunnyvale, CA (US); Navid Abedini, Somerset, NJ (US); Junyi Li, Chester, NJ (US); Kapil Gulati, Hillsborough, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 16/379,567

(22) Filed: Apr. 9, 2019

(65) Prior Publication Data

US 2019/0320465 A1 Oct. 17, 2019

Related U.S. Application Data

(60) Provisional application No. 62/657,599, filed on Apr. 13, 2018.

(51) Int. Cl.
*H04W 74/08* (2009.01)
*H04B 17/318* (2015.01)
*H04W 92/18* (2009.01)

(52) U.S. Cl.
CPC ...... *H04W 74/0816* (2013.01); *H04B 17/318* (2015.01); *H04W 92/18* (2013.01)

(58) Field of Classification Search
CPC . H04W 74/08; H04W 74/0816; H04W 92/18; H04B 17/318
See application file for complete search history.

(56) References Cited

U.S. PATENT DOCUMENTS

2005/0096031 A1* 5/2005 Sugaya ............. H04W 72/0446 455/422.1
2007/0133457 A1* 6/2007 Doi ................... H04W 74/0816 370/329

(Continued)

FOREIGN PATENT DOCUMENTS

EP 1622313 A1 2/2006
EP 3054736 A1 8/2016
EP 2910078 B1 2/2018

OTHER PUBLICATIONS

International Search Report and Written Opinion—PCT/US2019/026978—ISA/EPO—dated Jul. 3, 2019.

*Primary Examiner* — Brian P Cox
(74) *Attorney, Agent, or Firm* — Procopio, Cory, Hargreaves & Savitch LLP

(57) ABSTRACT

In an aspect of the disclosure, a method, a computer-readable medium, and an apparatus are provided. The apparatus may perform a slot reservation procedure to obtain a TxOP for communicating with a second UE. The slot reservation procedure may be performed in an earliest slot in the TxOP in which the first UE has data to send to the second UE. The apparatus may transmit the data to the second UE using at least one slot in the TxOP when the slot reservation procedure is successful. In certain aspects, all remaining slots in the TxOP may be reserved for the first UE when the slot reservation procedure is successful. The apparatus may refrain from performing a subsequent slot reservation procedure in another slot in the TxOP when the slot reservation procedure is unsuccessful unless an end of transmission signal is received during the TxOP.

26 Claims, 15 Drawing Sheets

(56) References Cited

U.S. PATENT DOCUMENTS

| | | | | |
|---|---|---|---|---|
| 2009/0109938 | A1* | 4/2009 | Singh | H04L 12/4035 370/337 |
| 2011/0086679 | A1* | 4/2011 | Li | H04W 52/38 455/572 |
| 2014/0003336 | A1* | 1/2014 | Padden | H04W 74/0875 370/328 |
| 2015/0172038 | A1* | 6/2015 | Jiang | H04L 27/0006 370/280 |
| 2018/0020359 | A1 | 1/2018 | Belghoul et al. | |

* cited by examiner

FAST-LOOP RESOURCE RESERVATION PROCEDURE

CROSS-REFERENCE TO RELATED APPLICATION(S)

This application claims the benefit of U.S. Provisional Application Ser. No. 62/657,599, entitled "Fast-Loop Resource Reservation Procedure" and filed on Apr. 13, 2018, which is expressly incorporated by reference herein in its entirety.

BACKGROUND

Technical Field

The present disclosure relates generally to communication systems, and more particularly, to a fast-loop resource reservation procedure.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may perform a slot reservation procedure to obtain a transmission opportunity (TxOP) for communicating with a second UE. The TxOP may include a plurality of contiguous slots, and the slot reservation procedure may be performed in an earliest slot in the TxOP in which the first UE has data to send to the second UE. The apparatus may transmit the data to the second UE using at least one slot in the TxOP when the slot reservation procedure is successful. In certain aspects, all remaining slots in the TxOP may be reserved for the first UE when the slot reservation procedure is successful. The apparatus may refrain from performing a subsequent slot reservation procedure in another slot in the TxOP when the slot reservation procedure is unsuccessful unless an end of transmission signal is received during the TxOP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
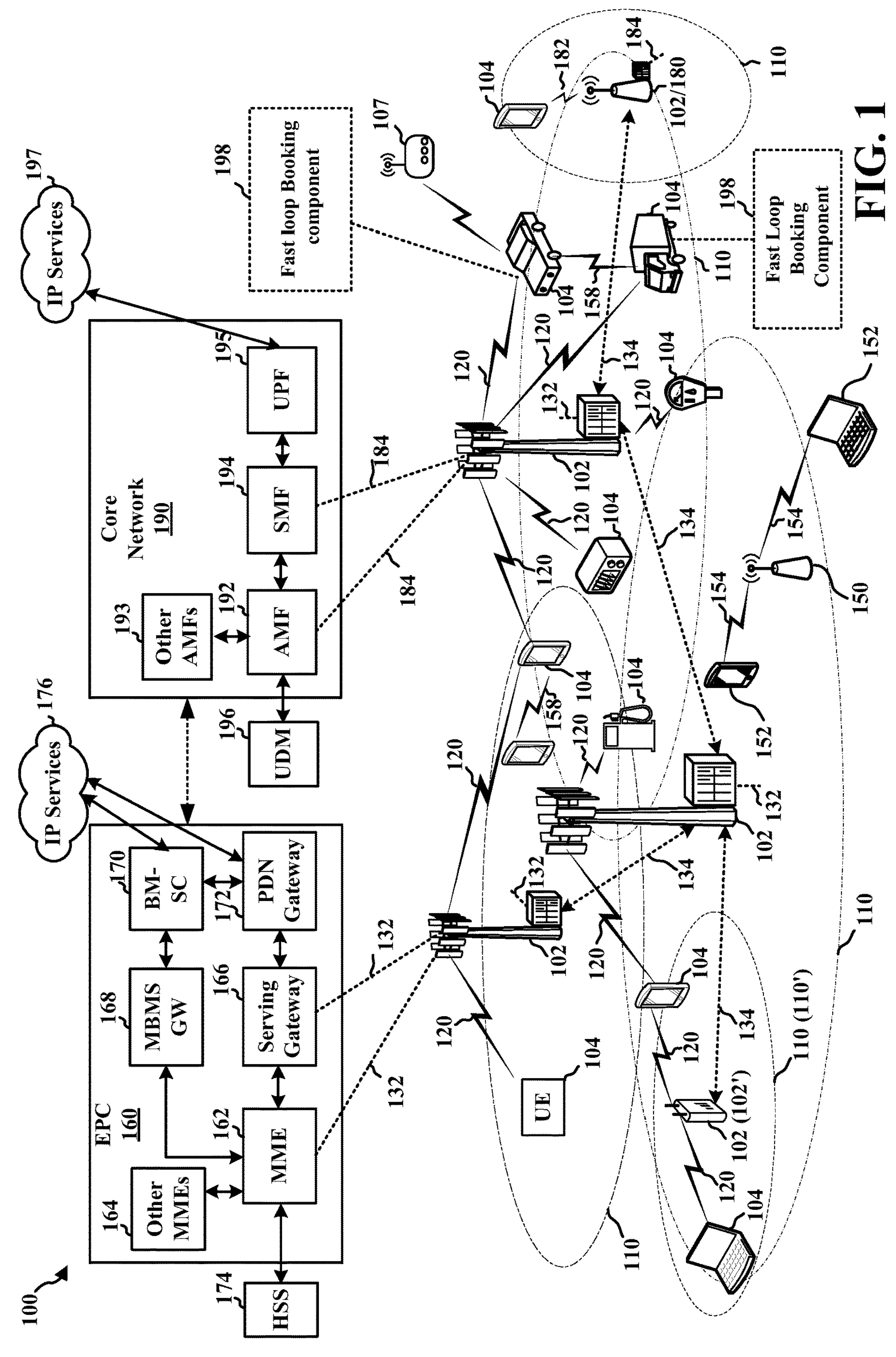
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming with the UE 104 to compensate for the extremely high path loss and short range.

The signal 182 transmitted by the base station 180 may comprise a beamformed signal to the UE 104 in one or more transmit directions, as described in connection with FIG. 4. The UE 104 may receive the beamformed signal from the base station 180 in one or more receive directions. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a UE 104, e.g., a transmitting Vehicle User Equipment (VUE) or other UE, may be configured to transmit messages directly to another UE 104, e.g., UE. The communication may be based on V2V/V2X or other D2D communication, such as Proximity Services (ProSe). Communication based on V2V, V2X, and/or D2D may also be transmitted and received by other transmitting and receiving devices, such as Road Side Unit (RSU) 107, etc. Aspects of the communication may be based on PC5 or sidelink communication.

One way to meet the increasing demand for mobile broadband may be to utilize the millimeter wave (mmW) spectrum in addition to LTE. However, communications using the mmW radio frequency band have extremely high path loss and a short range. Beamforming may be used to compensate for the extremely high path loss and short range.

Referring again to FIG. 1, in certain aspects, a UE 104 may comprise a fast loop booking component 198 that is configured to perform a fast-loop resource reservation procedure, e.g., as described below in connection with any of FIGS. 2A-8. For example, component 198 may be configured to perform a slot reservation procedure to obtain a TxOP for communicating with a second UE, the TxOP including a plurality of contiguous slots, and the slot reservation procedure being performed in an earliest slot in the TxOP in which the first UE has data to send to the second UE. The component 198 may transmit the data to the second UE using at least one slot in the TxOP when the slot reservation procedure is successful, all remaining slots in the TxOP being reserved for the first UE when the slot reservation procedure is successful and refrain from performing a subsequent slot reservation procedure in another slot in the TxOP when the slot reservation procedure is unsuccessful unless an end of transmission signal is received during the TxOP. Although certain aspects may be presented with examples focused on NR, the concepts described herein may be applicable to other similar areas, such as LTE, LTE-A, CDMA, GSM, and other wireless technologies.

Figure 2:
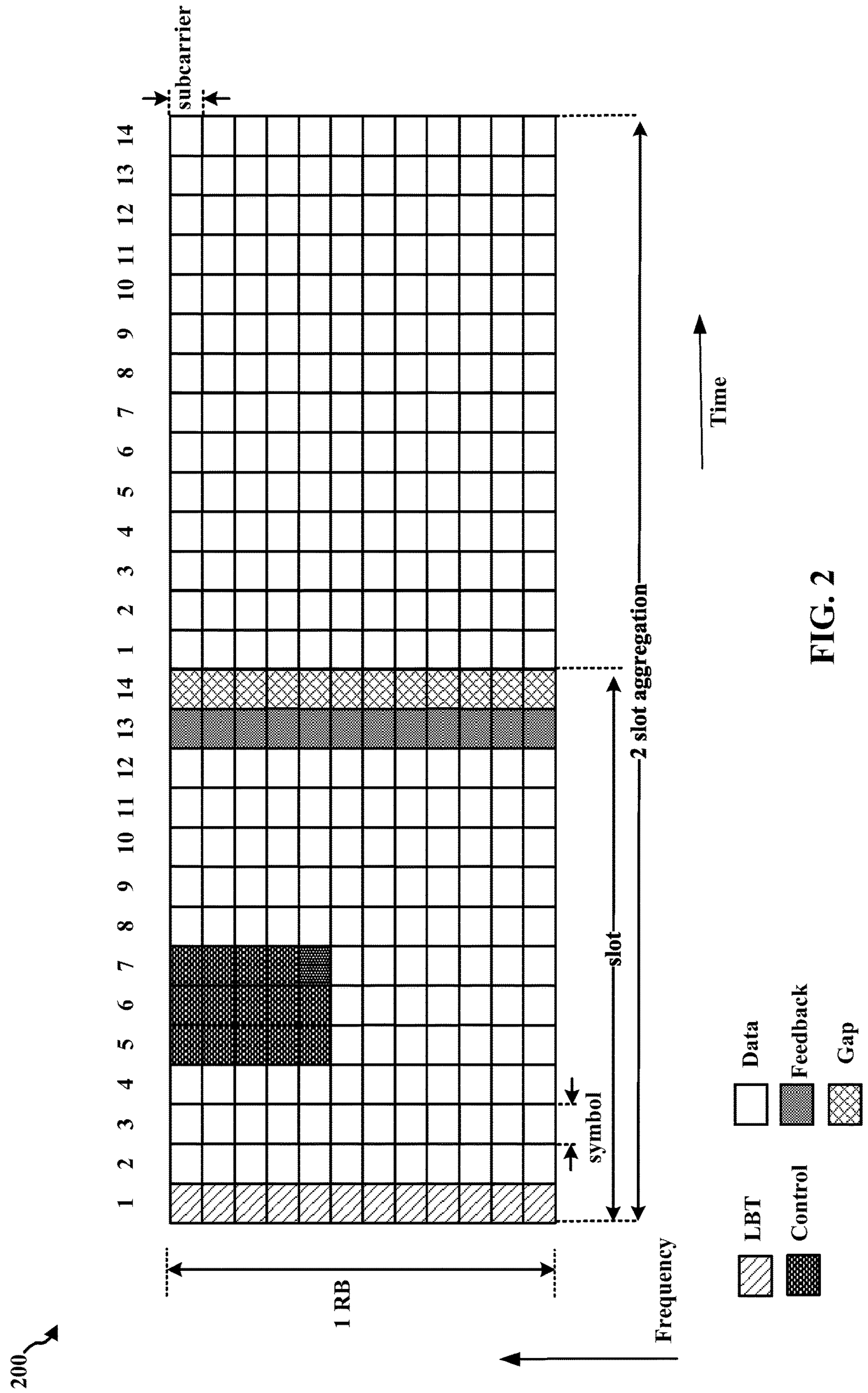
FIG. 2 illustrates an example of a sidelink slot structure.

FIG. 2 is a diagram 200 illustrating an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. A slot may be referred to as or include one or more transmission time intervals (TTIs), and may vary in length based on sub carrier spacing (SCS) or other configuration. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation reference signal (DM-RS). The control information may comprise Sidelink Control Information (SCI). At least one symbol at the beginning of a slot may be used by a transmitting device to perform a Listen Before Talk (LBT) operation prior to transmitting. At least one symbol may be used for feedback, as described herein. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 illustrates an example aggregation of two slot. The aggregated number of slots may also be larger than two. When slots are aggregated, the symbols used for feedback and/or a gap symbol may be different that for a single slot.

Figure 3:
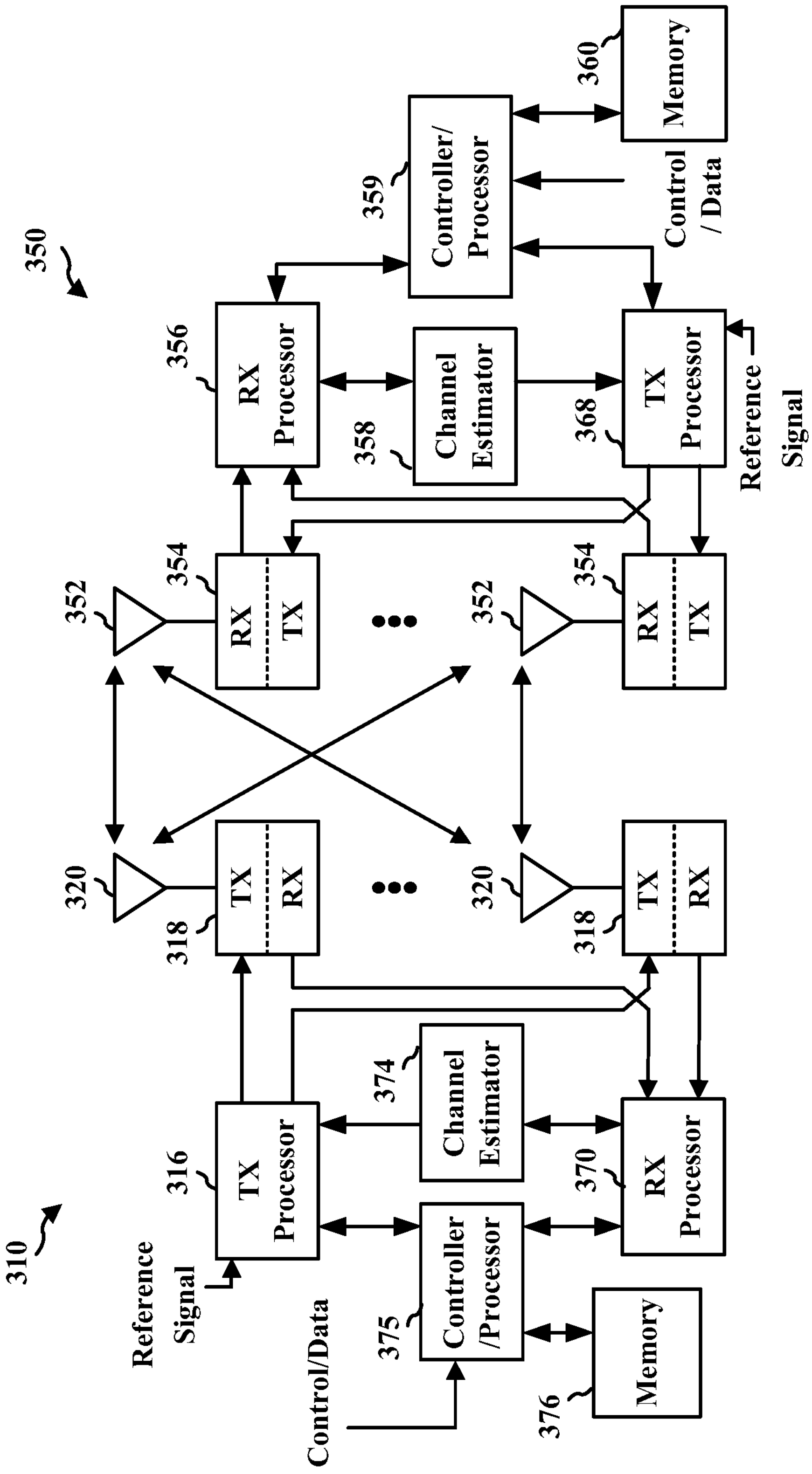
FIG. 3 is a diagram illustrating an example of a first device and a second device involved in wireless communication based, e.g., on V2V, V2X, and/or device-to-device communication.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the TX processor 316, the RX processor 356, the RX processor 370, the controller/processor 375, and the controller/processor 359 may be configured to perform aspects described in connection with 198 in FIG. 1.

Figure 4:
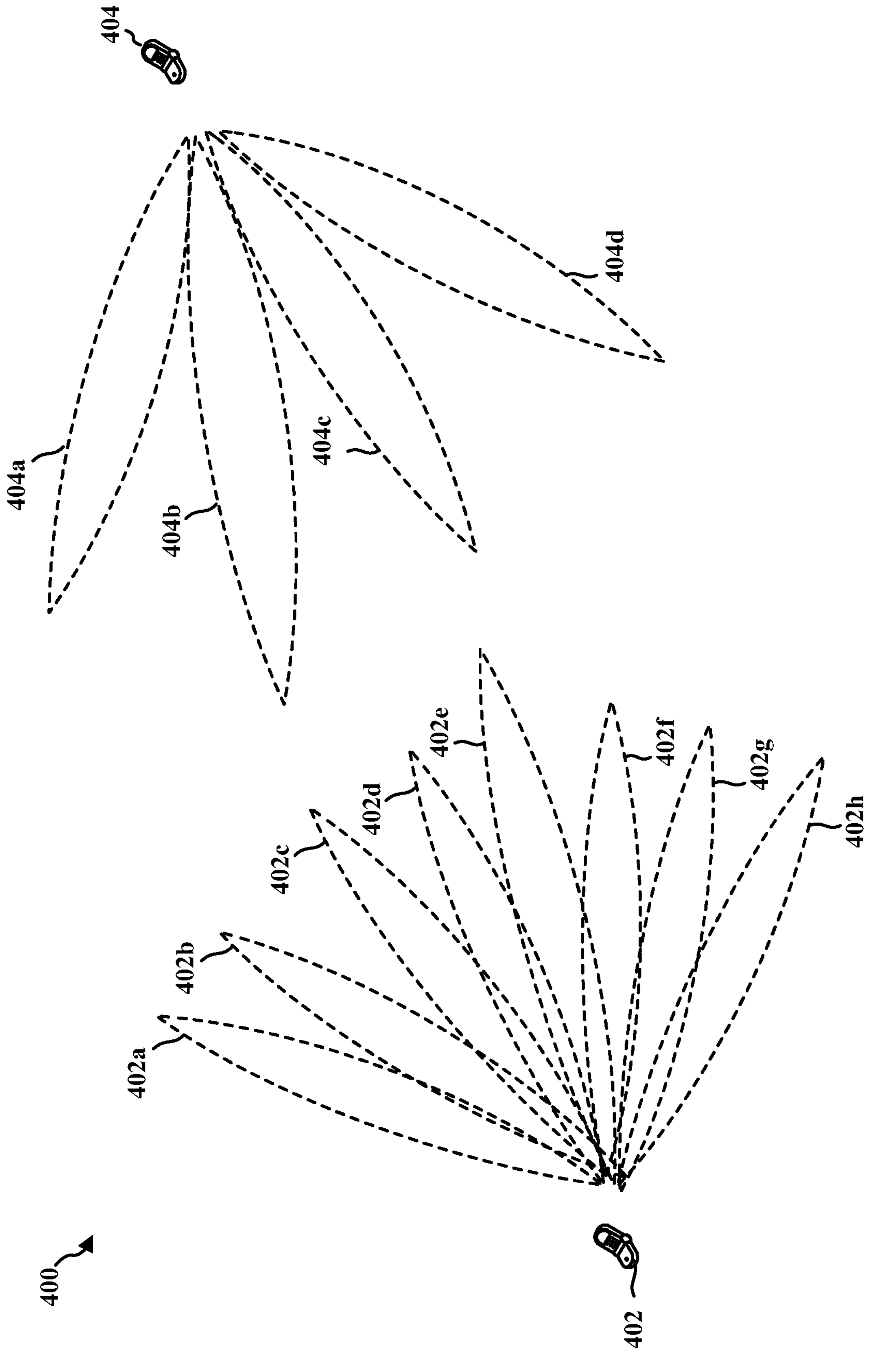
FIG. 4 is a diagram illustrating a base station in communication with a UE.

FIG. 4 is a diagram 400 illustrating a first wireless node 402 in communication with a second wireless node 404. Referring to FIG. 4, the first wireless node 402 may transmit a beamformed signal to the second wireless node 404 in one or more of the directions 402*a*, 402*b*, 402*c*, 402*d*, 402*e*, 402*f*, 402*g*, 402*h*. The second wireless node 404 may receive the beamformed signal from the first wireless node 402 in one or more receive directions 404*a*, 404*b*, 404*c*, 404*d*. The second wireless node 404 may also transmit a beamformed signal to the first wireless node 402 in one or more of the directions 404*a*-404*d*. The first wireless node 402 may receive the beamformed signal from the second wireless node 404 in one or more of the receive directions 402*a*-402*h*. The first wireless node 402/second wireless node 404 may perform beam training to determine the best receive and transmit directions for each of the first wireless node 402/second wireless node 404. The transmit and receive directions for the first wireless node 402 may or may not be the same. The transmit and receive directions for the second wireless node 404 may or may not be the same.

Antennas located at a wireless node (e.g., UE, base station, RSU, vehicle, etc.) may provide a wireless network with various properties that include, among others, gain and direction. Gain may be a measure of an increase in energy that an antenna adds to an RF signal that is transmitted by a wireless node. Direction may be the shape of the transmission pattern. Generally, wireless nodes that communicate using the mmW frequency spectrum network may either include omnidirectional antennas or directional antennas.

An omnidirectional antenna may be used to transmit a signal that has energy distributed in all directions rather than energy focused in the direction of the receiving node. Due to the omnidirectional nature of transmissions using an omnidirectional antenna, network capacity may be limited. For example, the distribution of energy in all directions may create unnecessary interference to neighbor nodes, and may decrease the range of transmissions.

With directional communications (e.g., using a directional antenna), both range and spatial reuse may be increased (as compared to omnidirectional communications) by having wireless nodes focus transmitted energy in the direction of the receiving node. At the receiving node, directional antennas may selectively receive signals from a desired direction, thereby increasing the signal to interference to noise ratio (SINK). Hence, the use of directional antennas may be desirable for communications using the mmW frequency spectrum in order to compensate for the extremely high path loss and short range.

When communicating in the mmW frequency spectrum, a wireless node may perform a Request-to-Send (RTS)/Clear-to-Send (CTS) procedure with one or more neighbor nodes in order to schedule one or more transmission opportunities (TxOPs) that do not conflict with the transmission schedule of neighbor nodes.

Because omnidirectional antennas may sense any potential scheduling conflicts (e.g., RTS/CTS procedure performed by one or more neighbor node contending for the same TxOP) in all directions, scheduling conflicts may not occur. However, because directional antennas may have limits in sensing potential scheduling conflicts outside a particular beamformed direction, scheduling conflicts may occur with neighbor nodes that are beamformed in different directions or are out of range, e.g., as described below in connection with FIG. 5A.

Figure 5A:
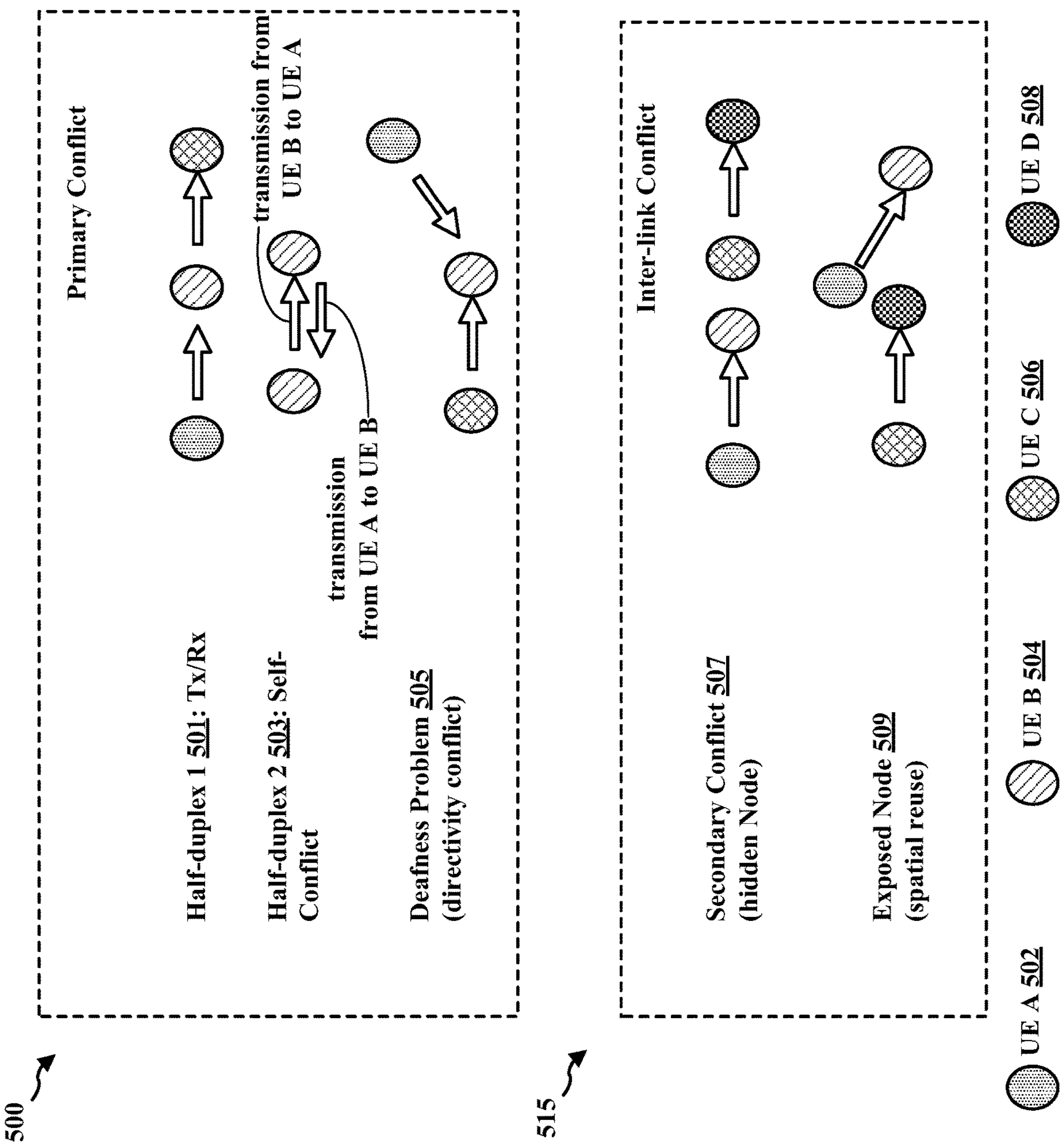
FIG. 5A is a diagram illustrating primary conflicts and inter-link conflicts that may be caused by the use of directional antennas in accordance with certain aspects of the disclosure.

FIG. 5A is a diagram illustrating primary conflicts 500 and inter-link conflicts 515 that may be caused by directional antennas in accordance with certain aspects of the disclosure. For example, the example primary conflicts 500 may include a first half-duplex conflict 501, a second half-duplex conflict 503, and/or a deafness challenge 505. The inter-link conflicts 515 may include, for example, a secondary conflict 507 (e.g., hidden node conflict) and/or an exposed node challenge 509 (e.g., spatial reuse conflict).

The first half-duplex conflict 501 may arise because directional antennas may be unable to concurrently send transmissions to a UE while receiving from a different UE when the UEs are not collocated. For example, UE A 502 may transmit data to UE B 504 using a same TxO UE A 502, UE B 504, and UE C 506 may perform a random access channel (RACH) procedure P that UE B 504 uses to transmit data to UE C 506. However, because UE B 504 is communicating in the opposite direction with UE C 506, UE B 504 may miss data concurrently transmitted by UE A 502. This may occur because directional antennas at UE B 504 may, in some cases, either be focused in the direction of UE A 502 or the direction of UE C 506, but not both directions at the same time.

Another half-duplex conflict 503 may involve UE B's 504 inability to concurrently send and receive data because directional antennas at UE B 504 may either be focused in the direction of UE A 502 or the direction of UE C 506, but not both directions. This conflict may be referred to as a self-conflict, because the conflict arises at a single device.

The deafness issue 505 may occur because UE B 504 might not be able to receive two different directional beams at the same time, e.g., from UE A 502 and UE C 506. Thus, UE A 502 may be unable to communicate with UE B 504 when UE B 504 is beamformed in the direction of UE C 506. In such an event, UE A 502 may perceive UE B 504 as having moved out of range, which may decrease the network throughput.

An example secondary conflict 507 may occur when communication from UE A 502 with UE B 504 causes interference to communication between UE C 506 and UE D 508. UE A 502 may be unaware of UE C 506 and/or UE D 508 because UE A 502 is out of range of these two UEs. When UEs are hidden and concurrent transmissions occur, UE A 502 may cause interference to UE C 506 and/or UE D 508 because the signal transmitted by UE A 502 propagates towards the direction of UE C 506 and/or UE D 508.

An exposed node conflict 509 may arise when, for example, UE A 502 has data to send to UE B 504 using a TxOP in a beamforming direction that does not interfere with a concurrent transmission between UE C 506 and UE D 508. However, because the network senses that UE C 506 has reserved the TxOP, UE A 502 may be forced to unnecessarily delay its transmission until a subsequent TxOP in which UE C 506 is not transmitting. The exposed node conflict 509 may limit communication despite of the fact that UE A 502 could transmit data to UE B 504 without causing interference, UE A 502 may be instructed to defer its transmission until sensing that the TxOP is unused, thereby reducing the spatial reuse of the network.

In order to sense potential scheduling conflicts in all directions (e.g., to determine if neighbor nodes are performing an RTS/CTS procedure for the same TxOP or are transmitting in the same TxOP), a wireless node using a directional antenna may perform a beam scanning procedure for all beams, which may require an undesirable amount power and increase the latency of the network. The present disclosure provides a solution to the challenges described above in connection with FIG. 5A using a TxOP reservation procedure (e.g., a slow-loop reservation procedure), e.g., as described below in connection with any of FIGS. 5B-8.

Figure 5B:
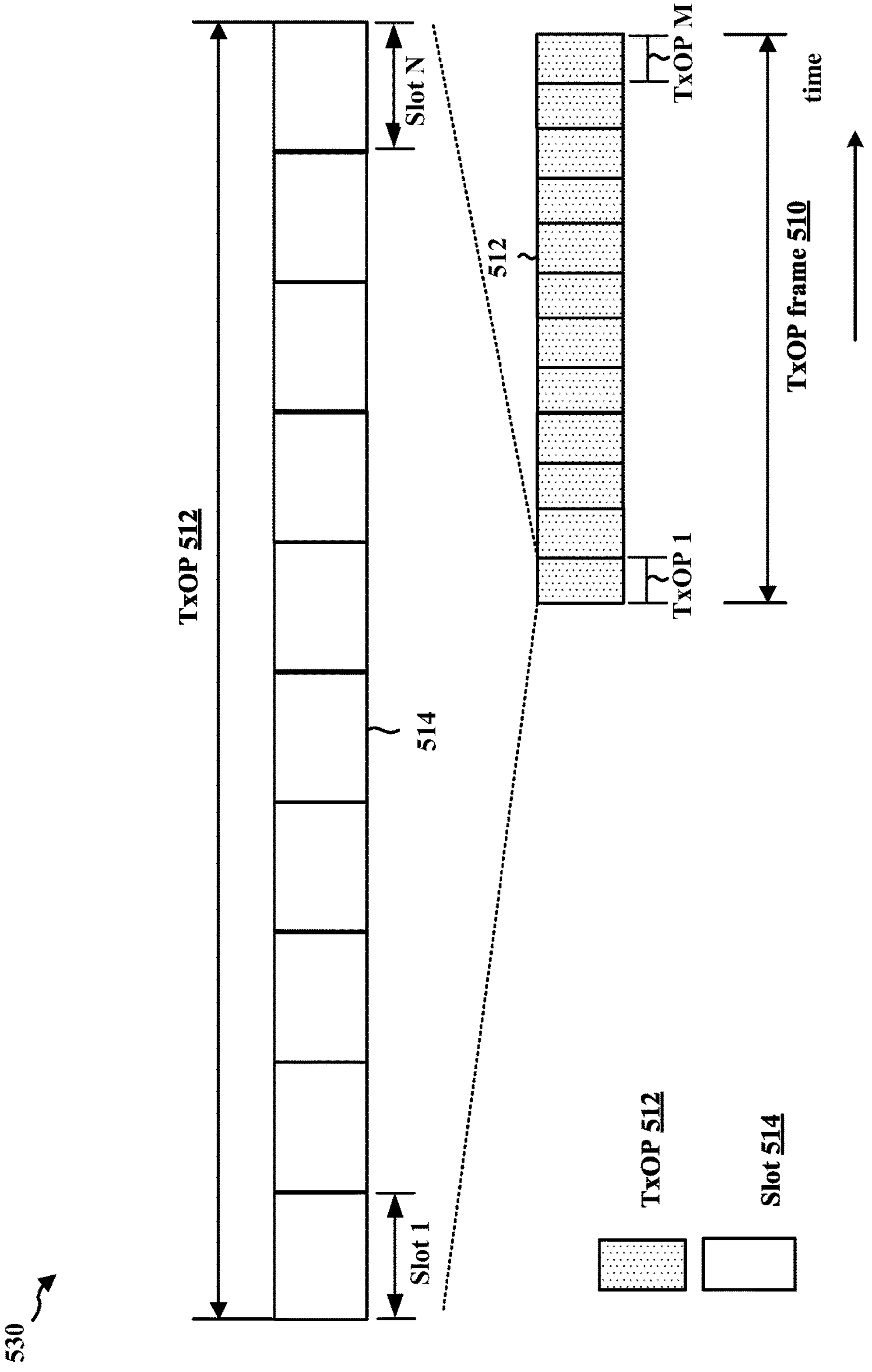
FIG. 5B is a diagram illustrating a transmission opportunity (TxOP) frame in accordance with certain aspects of the present disclosure.

FIG. 5B is a diagram 530 illustrating an example TxOP frame 510 in accordance with certain aspects of the present disclosure. Each TxOP frame 510 may include MTxOPs 512, and each TxOP 512 may include N slots. In the example illustrated in FIG. 5B, the TxOP frame 510 includes twelve TxOPs 512 (e.g., M=12), each TxOP having ten slots 514 (e.g., N=10). The example number of TxOPs in a TxOP frame, as well as the number of slots within a TxOP are merely examples to illustrate the principle. The number of TxOPs 512 per TxOP frame 510 is not limited to twelve, and the number of slots 514 per TxOP 512 is not limited to ten. Instead, the number of TxOPs 512 per TxOP frame 510 may include more or fewer than twelve and the number of slots 514 per TxOP 512 may include more or fewer than ten without departing from the scope of the present disclosure.

Figure 5C:
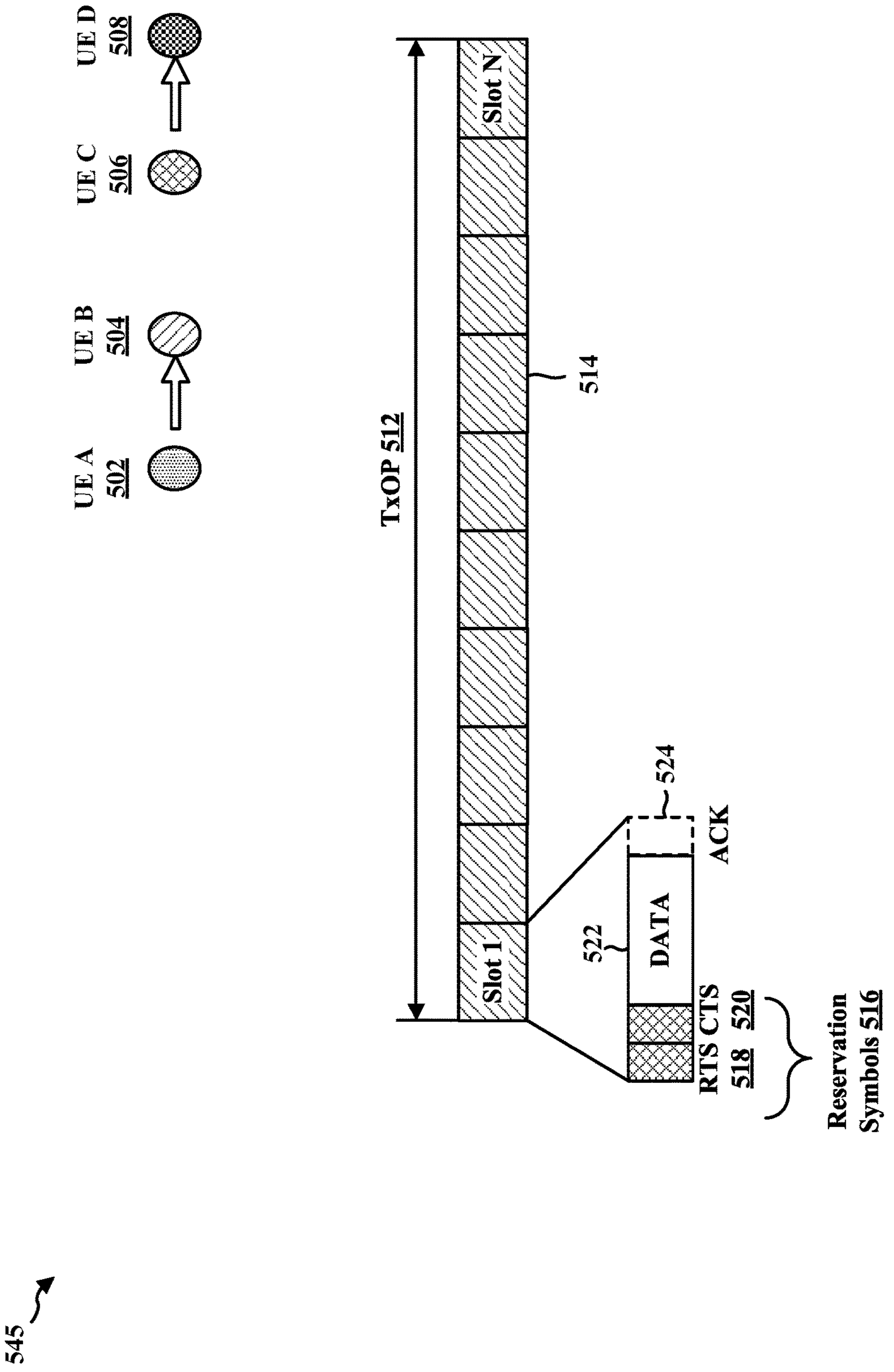
FIG. 5C is a diagram illustrating a set of reservation symbols in a slot that may be used to perform a slot reservation procedure in accordance with certain aspects of the disclosure.

FIG. 5C is a diagram 545 illustrating a set of reservation symbols 516 within a slot 514 that may be used to perform a slot reservation procedure (which may be referred to as a fast-loop resource booking procedure) in accordance with certain aspects of the disclosure.

Each slot 514 may include, e.g., a first set of reservation symbols 516, a second set of symbols 522 used to carry data, and a third set of symbols 524 used to carry an ACK/NACK. In certain implementations, the first set of reservation symbols 516 may be used to obtain the entire TxOP 512 for data transmission(s) for a UE. The first set of reservation symbols 516 may include one or more RTS symbols 518 that may be used to carry an RTS signal, and one or more CTS symbols 520 that may be used to carry a CTS signal. Although the terms RTS signal and CTS signal are used to describe this concept, the signals may also be referred to by other names. An RTS is a signal that represents a request or indication that a UE intends to use wireless resources for transmission. The RTS may be sent as part of a procedure that the UE uses to determine whether to proceed with using the resources. A CTS signal is a signal that a UE may send in response to an RTS or that otherwise indicates that the UE will have a conflict-free period for receiving a wireless communication, e.g., in accordance to the wireless resource requested in RTS. Although the first set of reservation symbols 516 is depicted with two symbols in FIG. 5C, more or fewer than two reservation symbols may be included in each slot 514 without departing from the scope of the present disclosure.

Within each TxOP 512, multiple UEs that may transmit in the same or similar beamforming direction may perform a slot reservation procedure in an attempt to obtain/reserve the TxOP. At the start of the slot reservation procedure, any of UE A 502, UE B 504, UE C 506, and/or UE D 508 may send an RTS signal in the one or more RTS symbols 518 in order to contend with other interfering links (e.g., RTS signals sent by other UEs) for the TxOP 512. Any UE that comes online after the first slot 514 in the TxOP 512 may wait until the next TxOP to perform a slot reservation procedure.

UE A 502 and UE C 506 may concurrently perform the slot reservation procedure in an attempt to obtain the TxOP 512 when UE A 502 wants to send data to UE B 504 and when UE C 506 wants to send data to UE D 508 (e.g., data will be transmitted in the same beam direction). Similarly, when UE B 504 wants to send data to UE A 502 and when UE D 508 wants to send data to UE C 506, UE B 504 and UE D 508 may concurrently perform the slot reservation procedure in an attempt to obtain the TxOP 512.

If UE C 506 does not have data to send to UE D 508 at the start of the TxOP 512, and UE A 502 sends one or more RTS signals in the one or more RTS symbols 518, UE A 502 may receive a CTS signal in the one or more CTS symbols 520 from UE C 506. When the CTS signal is received, UE A 502 may determine that the slot reservation procedure is successful, and transmit data using the second set of symbols 524 that carry data in any of the slots in the TxOP 512.

If UE D 508 and UE A 502 concurrently send an RTS signal in the one or more RTS symbols 518, the RTS signal transmitted by the other UE may not be heard since they are in opposite beam directions, and each of UE A 502 and UE D 508 may determine their respect slot reservation procedures are successful. Both UE A 502 and UE D 508 may transmit in the same TxOP since the transmissions are not in the same direction, and hence, are unlikely to cause interference to the other.

The first slot reservation procedure might not occur in slot 1, e.g., if no UEs have data to send in slot 1. However, a UE may still monitor for RTS signals and/or CTS signals in each slot in which the UE does not perform the slot reservation procedure. For example, if UE A 502 does not have data to send in slot 1, and thus does not perform the slot reservation procedure in slot 1, UE A 502 may still monitor for RTS signals and/or CTS signals from other UEs in every slot so that when UE A 502 has data, UE A 502 may take into account the slot reservation procedures performed by other UEs in earlier slots prior to performing a slot reservation procedure. Alternatively, the slot reservation procedure may be limited to performance in slot 1 (e.g., by having later slots in the TxOP be without RTS symbols 518 and/or CTS symbols 520). This alternative design reduces the burden on the UE, because the UE(s) do not need to monitor for RTS signals and/or CTS signals from other UEs in slots occurring after the 1st slot of the TxOP, because the reservation can be limited to occur in the first slot.

Figure 5D:
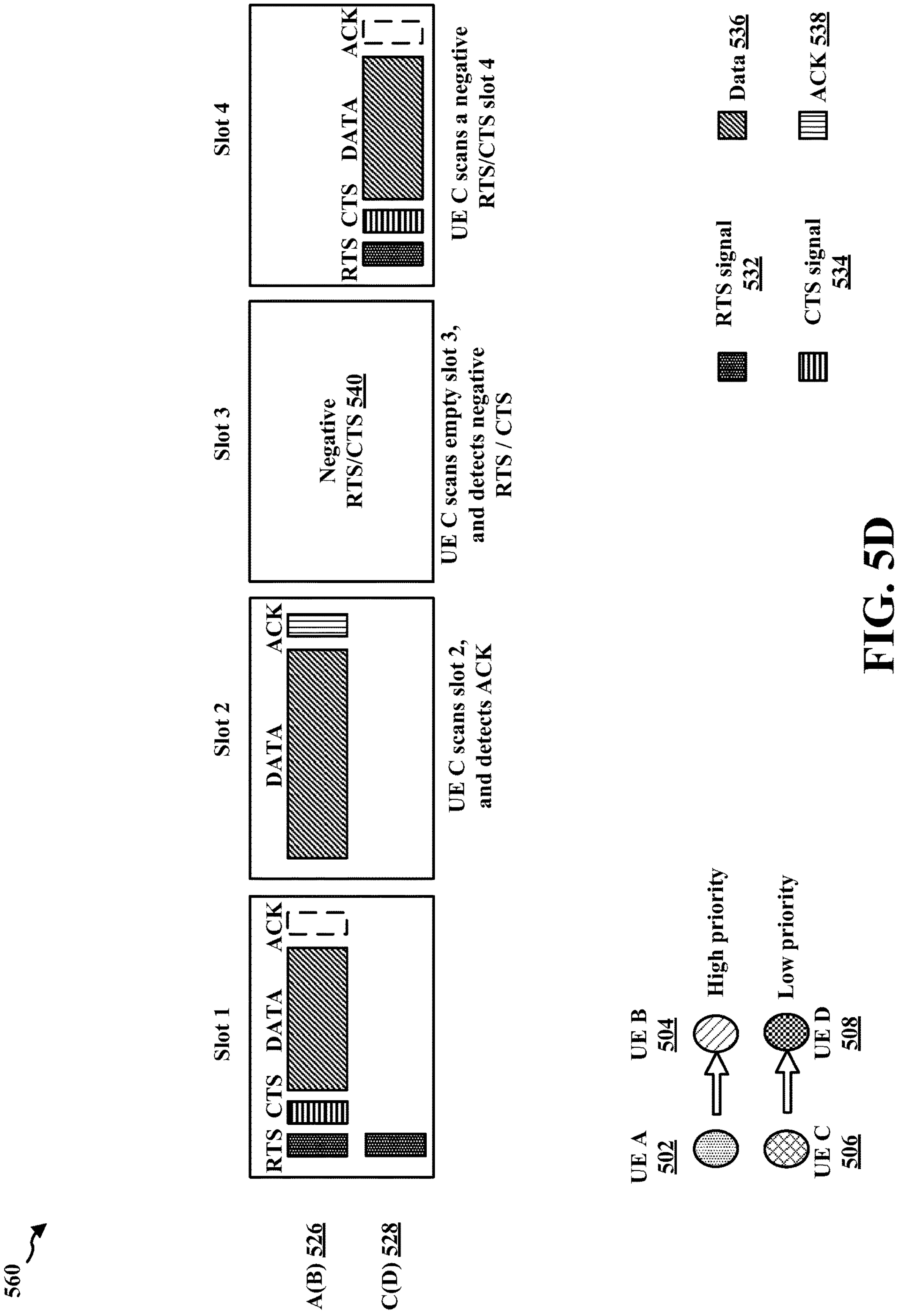
FIG. 5D is a diagram 560 illustrating an example slot reservation procedure (e.g., fast-loop booking procedure) that may be performed by one or more UEs in accordance with certain aspects of the present disclosure.

FIG. 5D is a diagram 560 illustrating an example slot reservation procedure 526, 528 that may be performed by UE A 502 and UE C 506 in accordance with certain aspects of the present disclosure. UE A 502 may include, e.g., UE 104, 350, the apparatus 702/702'. UE C 506 may include, e.g., UE 104, 350, the apparatus 702/702'. In the example illustrated in FIG. 5D, UE A 502 may perform the slot reservation procedure in an attempt to obtain a TxOP for communications with UE B 504, and UE C may perform the slot reservation procedure in an attempt to obtain the TxOP for communications with UE D 508. Communications sent from UE A 502 to UE B 504 are given a higher priority than communications sent from UE C 506 to UE D 508 in the example depicted in FIG. 5D. For clarity, spaces are depicted between the one or more RTS symbols 518, the CTS symbols 520, the set of data symbols 522, and the set of ACK/NACK symbols 524. However, there may be no gaps in the time domain between the RTS symbols and the CTS symbols, between the CTS symbols and the data symbols, or between the data symbols and the ACK/NACK symbols.

When UE A 502 and UE C 506 both send an RTS signal 532 at the start of slot 1, UE A 502 and UE C 506 may detect the RTS signal 532 transmitted by the other UE. Each of UE A 502 and UE C 502 may determine if the transmission power level of the detected RTS signal 532 is less than or equal to a threshold transmission power level. When the detected RTS signal 532 is less than or equal to the threshold power level, both UE A 502 and UE C 506 may obtain the same TxOP and may transmit data 536 using the second set of symbols 522 because the transmission power of the interfering transmission may low enough to cause minimal or no interference to the other transmission. Otherwise, when the detected RTS signal 532 is greater than the threshold power level, UE A 502 and UE C 506 may determine which UE has a higher priority in order to determine which UE obtains the TxOP 512, as described below.

For example, when UE A 502 and UE C 506 both send an RTS signal 532 at the start of slot 1, UE A 502 and UE C 506 may detect the other RTS signal 532 is above a threshold power level and determine which UE has a higher priority. In certain configurations, the RTS signal 532 may include one or more of a UE identification (ID) of the transmitting UE and/or an indication of which slots the UE intends to send data 536. The priority determination may by comparing the UE IDs to, e.g., a look-up table that includes a prioritized list of neighbor UEs. When UE A 502 has a higher priority as in the example depicted in FIG. 5D, UE C 506 may transmit a CTS signal 534, and UE A 502 may refrain from sending a CTS signal. Upon receipt of the CTS signal 534 from UE C 506, UE A 502 may determine that the slot reservation procedure is successful. UE C 506 may refrain from performing a subsequent slot reservation procedure until the next TxOP when the slot reservation procedure in slot 1 is unsuccessful unless a negative RTS/CTS is received from UE A 502.

In certain implementations, an entire duration of the TxOP 512 may be reserved for UE A 502 when the slot reservation procedure is successful. In certain other implementations, data 536 may be transmitted using two or more contiguous slots (e.g., slot 1 and slot 2 in FIG. 5D) in the TxOP 512. In an implementation not illustrated in FIG. 5D, the data 536 may be transmitted using two or more non-contiguous slots (e.g., slot 1 and slot 3) in the TxOP 512.

In certain configurations, upon receiving an ACK 538 from UE B 504 related to the transmitted data 536, UE A 502 may send a negative RTS 540 to UE C 506 to indicate that no remaining slots (e.g., slot 3 and slot 4) will be used by UE A 502 in the TxOP 512. UE C 506 may receive the negative RTS 540 in slot 3, and perform a subsequent slot reservation procedure by transmitting an RTS signal 532 using the slot reservation symbols at the start of slot 4. If UE C 506 receives a CTS signal 534 from UE A 502, then UE C 506 may transmit data 536 using the set of data symbols in slot 4.

Using the fast-loop booking procedure described above in connection with FIG. 5D, the secondary conflict 507 and/or the exposed node problem 509 described above in connection with FIG. 5A may be resolved. However, the fast-loop booking procedure may not resolve the first half-duplex conflict 501, the second half-duplex conflict 503, and the deafness problem 505 described above in FIG. 5A.

The reservation procedure described in connection with FIGS. 5C and 5D may be used in combination with other reservation procedures. For example, the fast-loop booking procedure of FIGS. 5C and 5D may be applied as a second tier procedure following a negotiation of a pattern of resources that will be used for communication between two devices.

Figure 5E:
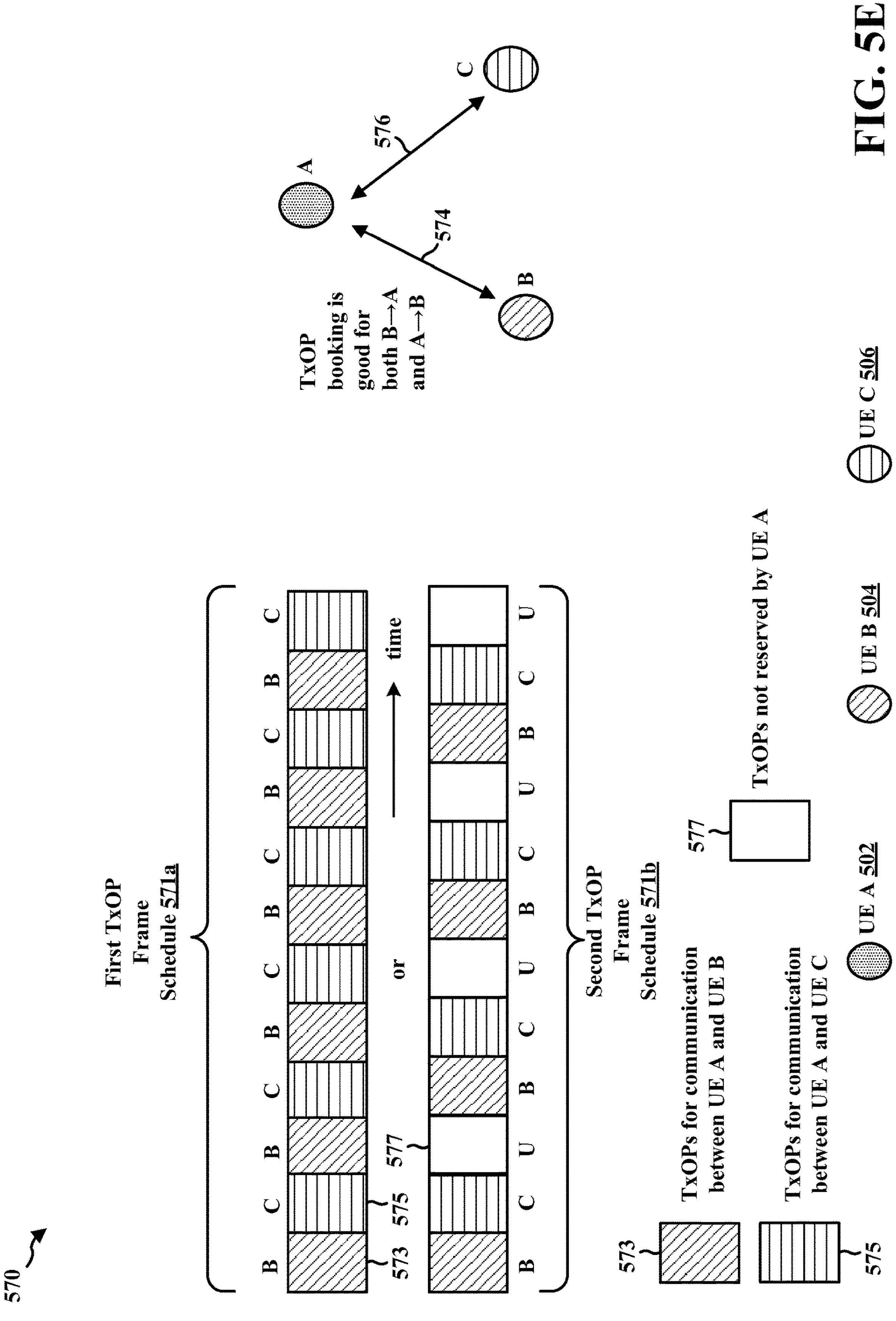
FIG. 5E is a diagram illustrating example TxOP frame schedules that may be used to reserve one or more TxOPs within a TxOP frame in accordance with certain aspects of the disclosure.

FIG. 5E is a diagram 570 illustrating two example TxOP frame schedules 571*a*, 571*b* that may be used to reserve one or more TxOPs within a TxOP frame in accordance with certain aspects of the disclosure. In certain implementations, the example TxOP frame schedules 571*a*, 571*b* may be used as a slow-loop booking procedure by a set of neighbor UEs 502, 504, 506 to overcome at least one of the conflicts 501, 503, 505, 507, 509 described above in connection with FIG. 5A.

Referring to FIG. 5E, the first example TxOP frame schedule 571*a* may be used by, e.g., UE A 502 to communicate with UE B 504 and UE C 506. The first example TxOP frame schedule 571*a* may include a first set of TxOPs 573 that are reserved for communications 574 between UE A 502 and UE B 504 in either the transmission direction from A to B or the opposite direction from B to A (e.g., a pairwise reservation between the UE A 502 and UE B 504), and a second set of TxOPs 575 that are reserved for communications 576 between UE A 502 and UE C 506 (e.g., a pairwise reservation between the UE A 502 and UE C 506).

The second example TxOP frame schedule 571*b* may be used by, e.g., UE A 502 to communicate with UE B 504 and UE C 506. The second example TxOP frame schedule 571*b* may include a first set of TxOPs 573 that are reserved for communications 574 between UE A 502 and UE B 504 (e.g., a pairwise reservation between the UE A 502 and UE B 504), a second set of TxOPs 575 that are reserved for communications 576 between UE A 502 and UE C 506 (e.g., a pairwise reservation between the UE A 502 and UE C 506), and a third set of TxOPs 577 that are not reserved by UE A 502, and hence, available for scheduling by other neighbor UEs.

Each of UE A 502, UE B 504, and UE C 506 may perform a random access channel (RACH) procedure (e.g., a 4-way handshake between two UEs) to discover neighboring UEs. Once the RACH procedure(s) between a set of neighbor UEs is complete (on a one time or periodic basis), TxOP reservations in a TxOP frame may be negotiated between the set of neighbor UEs. A UE may perform a beam-scanning or beamforming procedure. For example, a UE may perform monitor for a signal or perform measurements of a signal on each of plurality of possible beam directions, e.g., sweeping a set of predefined reception beam directions, in order to attempt to detect a signal from another UE in one of those directions. The process may be referred to as beam-scanning. The UE may select a beam based on a detected signal or based on a measurement of the signal in a particular beam direction.

A random access procedure may involve one UE transmitting a first random access message comprising a random access preamble, e.g., indicating a selected beam direction. The beam direction may be selected based on the beam scanning/beamforming procedure. The UE may receive a second random access message from a second UE in response to the first message and acknowledging the random access preamble from the first UE. The first UE may send a third random access message, e.g., indicating one or more channel measurements and/or identifying the first UE. The first UE may receive a fourth random access message from the second UE acknowledging the third message. The first UE may transmit communication in response to receiving the fourth random access message from the second UE. While this example is described in connection with a 4 step RACH procedure, a different number of messages may be exchanged as part of the random access procedure. For example, a 2 step random access procedure may be performed in which the first and the third random access messages from the first UE are combined into message A and the second and fourth response messages from the second UE are combined into message B.

A TxOP frame schedule may be semi-static in that a set of neighbor UEs may use the TxOP frame schedule for the duration of multiple TxOP frames. However, if a TxOP reserved for communication between two UEs is unused for a threshold period (e.g., if neither UE has data to exchange), the set of neighbor UEs may renegotiate the TxOP frame schedule so that resources may be more efficiently utilized, and hence, the network throughput may be increased.

Figure 5F:
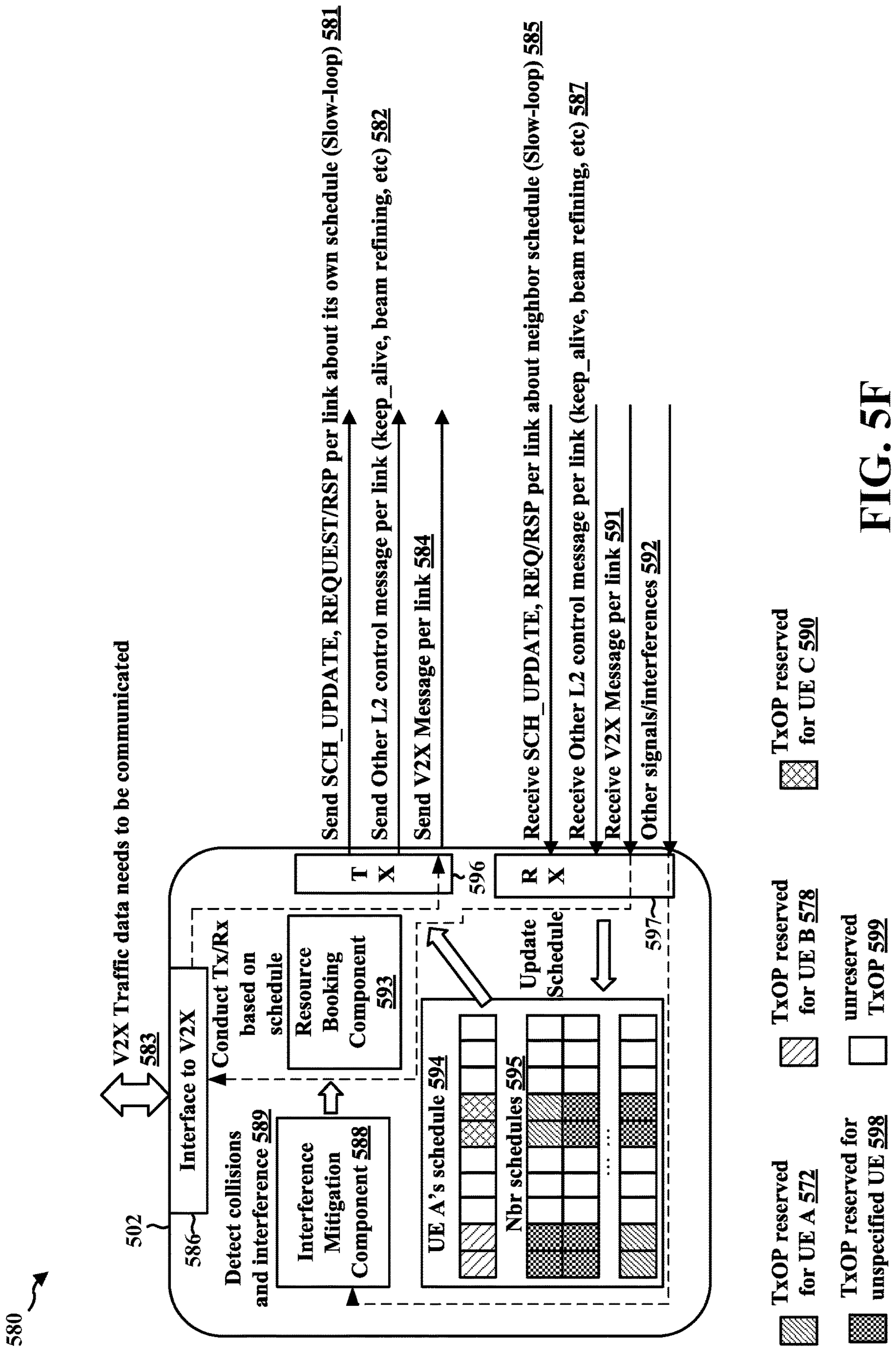
FIG. 5F is a data flow for a TxOP reservation procedure (e.g., a slow-loop reservation procedure) that may be performed by one or more devices in accordance with certain aspects of the present disclosure.

FIG. 5F illustrates aspects of an example data flow 580 for a TxOP a reservation procedure (e.g., a slow-loop reservation procedure) that may be performed by UE A 502, UE B 504 (not illustrated in FIG. 5F), and/or UE C 506 (not illustrated in FIG. 5F) in accordance with certain aspects of the present disclosure. Such aspects may be performed in combination with the RTS/CTS aspects described in connection with FIGS. 5C and 5D. For example, the UE may first negotiate or come to an agreement with another UE about the TxOPs, e.g., a schedule of TxOPs, that will be used to communicate with the UE. Then, within the agreed TxOPs, the UE may use the fast-loop booking procedure to determine whether to transmit within certain slots of a TxOP of the schedule of TxOPs.

In certain implementations, UE A 502 may be unable to arbitrarily book TxOPs for communications with another UE because a scheduling conflict may arise when the same TxOP is reserved by another neighboring UE. Thus, UE A 502 may use the TxOP reservation procedure described below in order to avoid scheduling conflicts with neighbor UEs. UE A 502 may correspond to, e.g., the UE 104, 350, the apparatus 702/702'. UE A 502 may include an interference mitigation component 588, a resource booking component 593, a reception component 597, a transmission component 596, and a vehicle-to-everything (V2X) interface 586 for communications between a vehicle (e.g., when UE A is a vehicle) and another device.

In certain configurations, UE A 502 may perform a beamforming procedure with each of UE B 504 and UE C 506 to determine a preferred beamforming direction for communications with each of UE B 504 and UE C 506. For example, UE A 502 may perform the beamforming procedure as described above in connection with FIG. 4. In certain implementations, the reception component 597 and/or the transmission component 596 may perform the beamforming procedure by exchanging (at 582 and 587) L2 messages related to beamforming, e.g., such as beam refining messages (e.g., beam_refining message) and/or instructions (e.g., beam_alive message) to maintain a previously determined beamforming direction.

In certain implementations, a primary-secondary relationship between the first UE and one or more of the plurality of neighbor UEs may be established during the beamforming procedure. The primary-secondary relationship may be useful in scenarios in which a TxOP frame schedule cannot be agreed upon by two or more UEs. For example, when UE A 502 is the primary UE, and an agreement cannot be reached with a secondary UE with respect to a TxOP frame schedule, UE A 502 may select the TxOP frame schedule that will be used by UE A 502 and the secondary UE. In certain implementations, the primary-secondary relationship may be negotiated and/or determined during the 4-way handshake RACH procedure performed to discover neighbor UEs. In certain other implementations, the primary-secondary relationship may be chosen at random. The UE acting as the primary UE may switch periodically so each UE in a set of neighbor UEs is the primary UE for a certain period of time.

In certain configurations, UE A 502 may perform a beam sensing procedure to determine which TxOPs of the M TxOPs in a TxOP frame are available in the preferred beamforming direction for each of the neighbor UEs. For example, the reception component 597 may receive (at 592) interference and/or other signals related to neighbor transmissions in one or more TxOPs in a TxOP frame. The reception component 597 may send information associated with the interference and/or other signals to the interference mitigation component 588. The interference mitigation component 588 may determine the TxOPs which may carry network traffic based at least in part on detected (at 589) interference and/or collisions. Information associated with the TxOPs which carry network traffic may be sent to the resource booking component 593.

The resource booking component 593 may generate a first transmission schedule based at least in part on the information related to beam sensing procedure sent by the interference mitigation component 588. For example, the resource booking component 593 may generate a proposed first transmission schedule 594 that reserves a first set of TxOPs 578 (e.g., TxOP 1 and TxOP 2) for communications with UE B, a second set of TxOPs 590 (e.g., TxOP 6 and TxOP 7) for communications with UE C, and a third set of TxOPs 599 (e.g., TxOP 3, TxOP 4, TxOP 5, TxOP 8, TxOP 9, and TxOP 10) that are not reserved by UE A 502. In certain configurations, the proposed first transmission schedule 594 may include a reserved indicator (e.g., an 'R' flag) to indicate that the second set of TxOPs of the M TxOPs is reserved for communications between UE A 502 and an unspecified neighbor UE. The reserved indicator (e.g., used in TxOPs reserved for unspecified UE 598 in neighbor schedules 595) may be used instead of including a UE identification (ID) of the neighbor UE in order to protect the privacy of the neighbor UE. In certain implementations, the proposed first transmission schedule 594 may include a beam index and/or a quasi-collocation (QCL) index (or other QCL information) indicating the preferred beamforming direction associated with one or more of the first set of TxOPs and/or the second set of TxOPs. Including the beam index and/or QCL index may indicate to neighboring UEs which beam directions communications using the reserved TxOPs may occur. Based at least in part on the beam index and/or QCL index, the neighbor UEs may be able to determine to use the same TxOP for communications with other UEs in different beamforming directions, thereby increasing the spatial reuse of the network.

The resource booking component 593 may also generate a first scheduling request that includes the proposed first transmission schedule 594, and may send the first scheduling request to the transmission component 596. Using the transmission component 596, UE A 502 may transmit (at 581) the first scheduling request to one or more of UE B 504 and/or UE C 506. In certain configurations, the first scheduling request may include the proposed first transmission schedule 594 for M TxOPs, where M=10 in FIG. 5F. The first scheduling request may be transmitted (at 581) using, e.g., a D2D sidelink.

Figure 9:
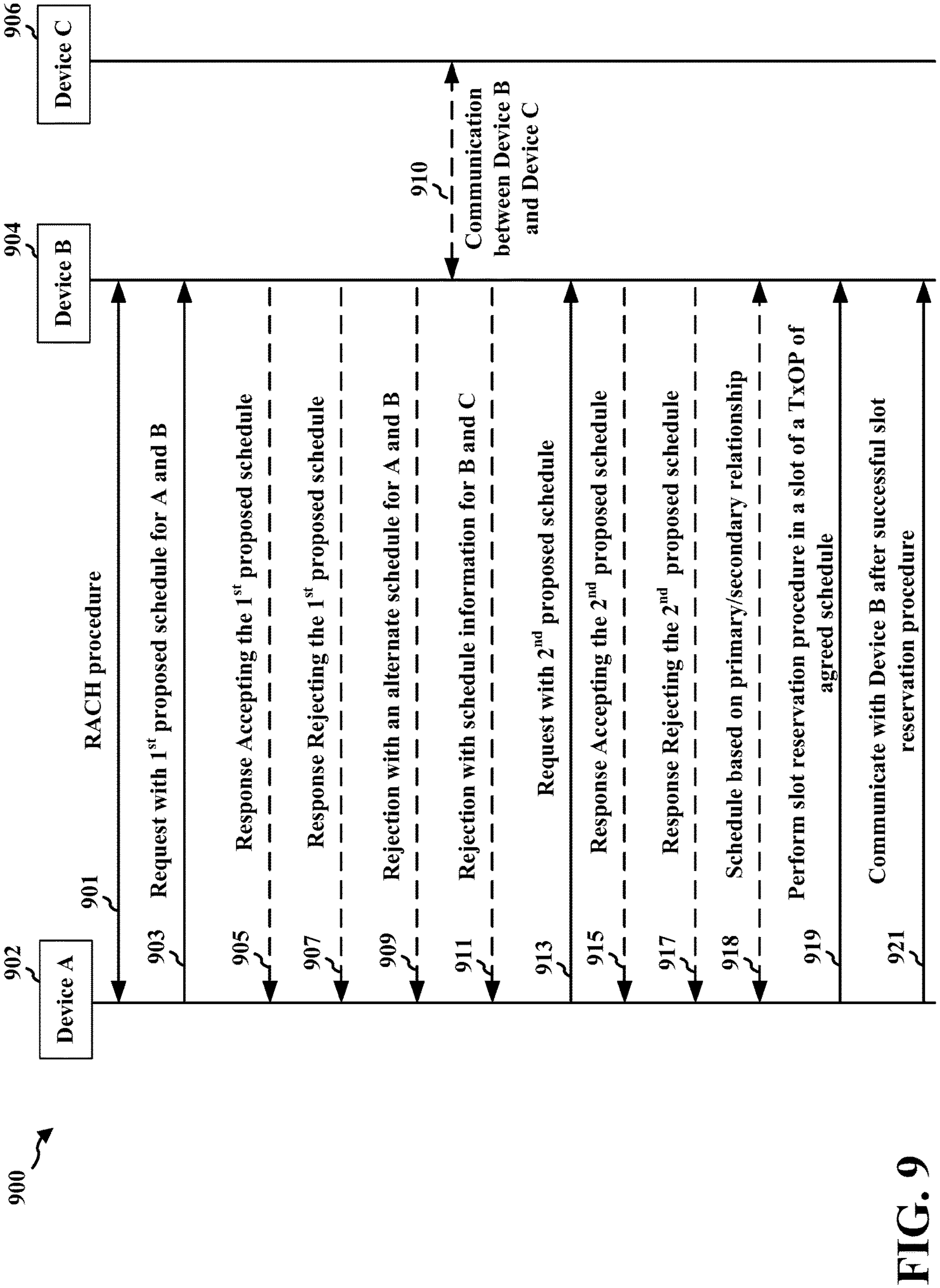
FIG. 9 is a diagram of an example communication flow between wireless devices.

FIG. 9 illustrates an example communication flow 900 between a first device (Device A, e.g., UE A 502) 902 and a second device (Device B, e.g., UE B 504) 904 including request(s)/responses(s) to negotiate resources for communication between the two devices. The example flow 900 may be described with reference to the example in FIG. 5F and may use the same reference numerals in FIG. 5F for ease of discussion. As described herein, the devices may first perform a RACH procedure, e.g., a 4 step RACH procedure 901. Following the RACH procedure, Device A 902 may transmit a scheduling request 903 to Device B along with a proposed schedule (of TxOPs) for the communication between Device A and Device B. The first scheduling request may include the proposed first transmission schedule 594 for M TxOPs, where M=10 in FIG. 5F.

For example, in FIG. 5F, UE A 502 may receive (e.g., at 585) using reception component 597 a first scheduling response from UE B 504. In certain configurations, the first scheduling response may indicate whether UE B 504 accepts or rejects the first scheduling request transmitted (at 581) by UE A 502. As illustrated at 905 in FIG. 9, Device B 904 may transmit a response accepting the proposed schedule from 903. For example, the first scheduling response may accept the first scheduling request by not including an alternative transmission schedule in the first scheduling response 905. As illustrated at 907, Device B 904 may respond with a rejection of the request. The rejection may be due to a conflict of the proposed schedule in 903 with another schedule used by Device B 904 for communication with another device. Thus, additionally and/or alternatively, the scheduling response may include an alternative transmission schedule for communication between Device A 902 and Device B 904 based on the M TxOPs, e.g., as illustrated at 907.

The alternate transmission schedule sent at 909 may indicate a fourth set of TxOPs 572 of the M TxOPs that is reserved by UE B 504 for communication with UE A 502 as an alternative to the proposed schedule sent by Device A 902 at 903. Thus, Device B 904 may continue the negotiation even when the first scheduling response rejects the first scheduling request by including a proposed alternative transmission schedule. Additionally and/or alternatively, Device B 904 may respond to Device A 902 by sending neighbor scheduling information 911 about TxOPs that are reserved for communications 910 between the UE B 506 and a different UE (e.g., Device C 906) from among a plurality of neighbor UEs. Device B 904 might indicate the reserved resources without identifying Device C.

The reception component 597 may send the first scheduling response and/or a neighbor scheduling information 595, received at 911, to the resource booking component 593. Using the neighbor scheduling information 595, resource booking component 593 may generate a second proposed transmission schedule by adjusting and/or updating the first proposed transmission schedule sent at 903. In certain aspects, the second proposed transmission schedule, sent at 913, may indicate a different set of TxOPs of the M TxOPs reserved for communication between UE A 502 and UE B 504. The different set of TxOPs (e.g., in the first proposed transmission schedule at 903 and in the second proposed transmission schedule at 913) may include at least one different TxOPs. The TxOPs may be completely different or partially different.

The resource booking component 593 may generate a second scheduling request that includes the second proposed transmission schedule, and send the second scheduling request to the transmission component 596, e.g., as illustrated at 913 in FIG. 9. UE A 502 may transmit (at 581) the second scheduling request that includes the second proposed transmission schedule to at least UE B 504 of the plurality of neighbor UEs using the transmission component 596. In certain configurations, the second proposed transmission schedule may be transmitted via a unicast link and/or D2D link established with at least UE B 504. In certain other configurations, the second proposed transmission schedule may be transmitted using the preferred beamforming direction associated with UE B 504.

Using the reception component 597, UE A 502 may receive a second scheduling response from UE B 504, e.g., as illustrated for Device A 902 and Device B 904 at 915/917 in FIG. 9. In certain aspects, the second scheduling response may either accept (e.g., 915) or reject (e.g., 917) the second scheduling request 913. The second scheduling response 917 may include another alternative transmission schedule and/or additional scheduling information, similar to example rejections 909, 911. The resource booking component 593 may update the second proposed transmission schedule based at least in part on the alternative transmission schedule. The process may continue until Device A 902 and Device B 904 find a transmission schedule that is acceptable for both devices.

In scenarios in which a TxOP frame schedule cannot be agreed upon by Device A and Device B 904, one of the Devices may select the TxOP schedule based on a primary-secondary relationship between the UE. Thus, at 918, Device B 904 may send a message with a schedule selected by Device B 904 as the primary device that should be used by Device A 902 as the secondary device. The primary and secondary device relationship may be agreed at an earlier point, such as during the RACH procedure 901. Similarly, if Device A 902 were the primary device, then Device A 902 would send the message 918 to Device B 904 as the secondary device. The selected schedule, in message 918, may be sent after a certain number of scheduling requests or proposed schedules and responses rejecting proposed schedules.

Once the two devices agree upon a transmission schedule, UE A 502 may monitor or communicate (at 583) data based on the accepted transmission schedule, e.g., such as when the second scheduling response 915 from Device B 904 does not include an alternate transmission schedule. Upon agreement of a schedule, communicating or monitoring for communications may take place according to the schedule. For example, a UE may tune transmission beam and/or a receive beam to a beamforming direction based on the schedule. Using a TxOP schedule negotiated using the techniques described above, UE A 502 may transmit and/or receive (at 584 and 591, respectively) one or more data transmissions from UE B 504 in a reserved TxOP. For example, when UE A 502 is a vehicle, the interface to V2X 586 may generate one or more V2X messages to send to UE B 506, and send a V2X message to the transmission component 596. The transmission component 596 may transmit (at 584) a V2X message to UE B 504 using one or more TxOPs reserved for communications between UE A 502 and UE B 504. Similarly, the reception component 597 may receive (at 591) a V2X message from UE B 504 using one or more TxOPs reserved for communications between UE A 502 and UE B 504, and send the V2X message to the interface for V2X 586 for processing. When UE A 502 and UE B 504 are both vehicles, the V2X messages may communicate information related to the UE's speed, acceleration, direction, route, and/or destination, etc. Using the information received in the V2X message(s), UE A 502 may change one or more of speed, acceleration, direction, route, and/or destination, etc. for safety.

Periodically, UE A 502 may determine if the network traffic has changed, e.g., either using the beam sensing procedure (e.g., sensing beam usage patterns by a set of neighbor UEs, sensing which beam directions have network traffic, etc.)) described above, or based on TxOP scheduling updates received from neighbor UEs. Upon determining the network traffic has changed, UE A 502 may generate a new transmission schedule that is included in a schedule update message (e.g., SCH UPDATE message) that is sent to one or more of the neighboring UEs.

Using the slow-loop booking procedure described above in connection with FIG. 5F, the first half-duplex conflict 501, the second half-duplex conflict 503, and the deafness challenge 505 described above in connection with FIG. 5A may be resolved. However, the slow-loop booking procedure may not resolve the secondary conflict 507 and/or the exposed node challenge 509 described above in FIG. 5A.

As illustrated in FIG. 9, once Device A 902 and Device B 904 agree on a schedule, whether Device B 904 accepts the $1^{st}$ proposed schedule at 905, accepts the $2^{nd}$ proposed schedule at 915, or Device A 902 accepts the alternate schedule proposed by Device B at 909, Device A 902 may perform a slot reservation procedure in a slot of one of the TxOPs from the agreed schedule. If Device A 902 and Device B 904 agreed to a transmission schedule similar to 571*a*, in which Device A 902 may communicate with Device B 904 in every other TxOP of a TxOP frame, Device A 902 may perform the slot reservation procedure at 919 in a slot of a TxOP 578, that is reserved for communication with Device B 904, before transmitting to Device B 904. For example, Device A 902 may send a RTS and monitor for a CTS, as described in connection with any of FIG. 5C, 5D, 6A, or 6B. Once Device A 902 has successfully performed the slot reservation procedure, Device A 902 may communicate with Device B 904. For example, Device A 902 may transmit communication to Device B 904 in at least one slot of the TxOP following a successful slot reservation procedure.

Figure 6A:
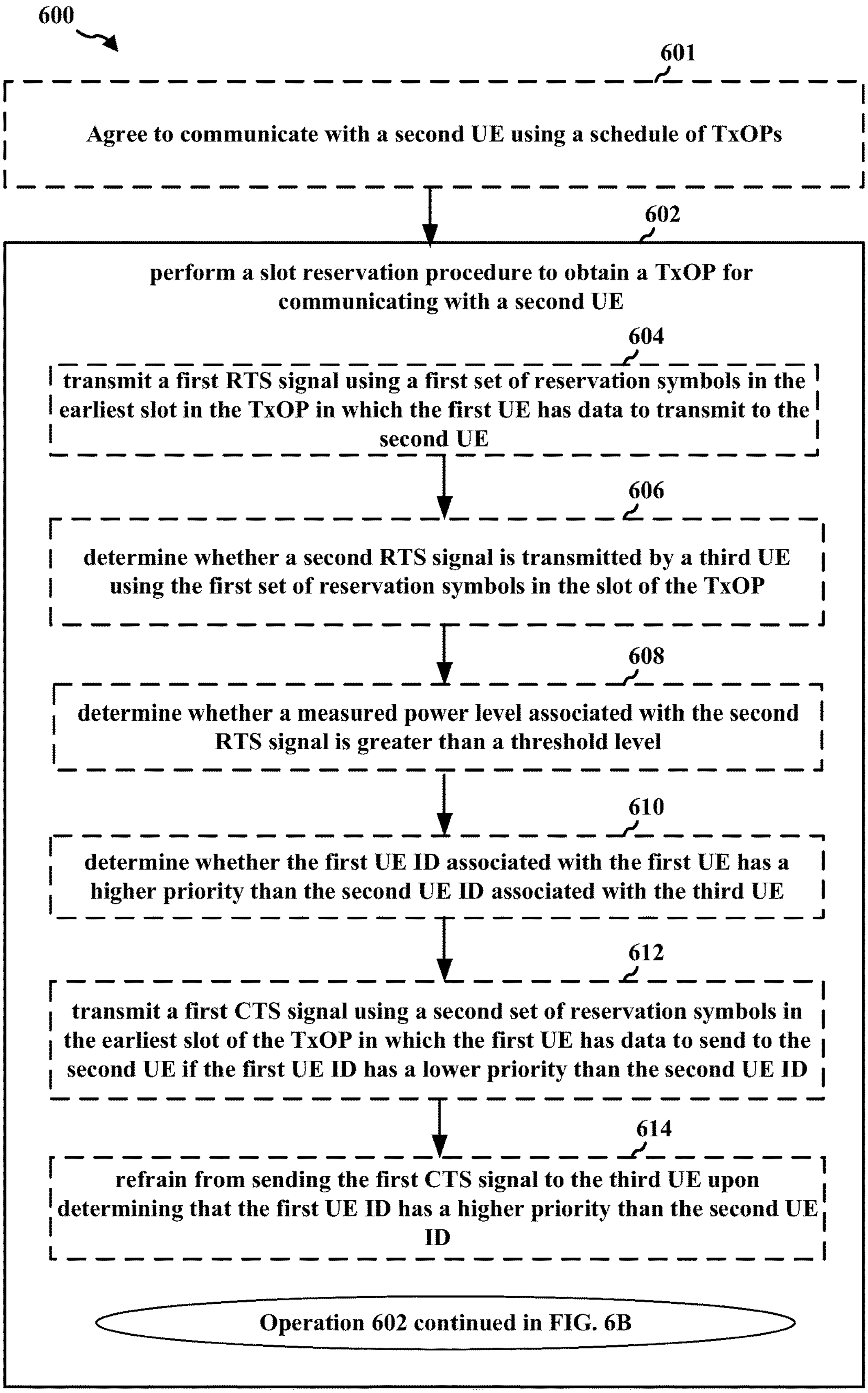
FIGS. 6A and 6B are a flowchart of a method of wireless communication.
Figure 6B:
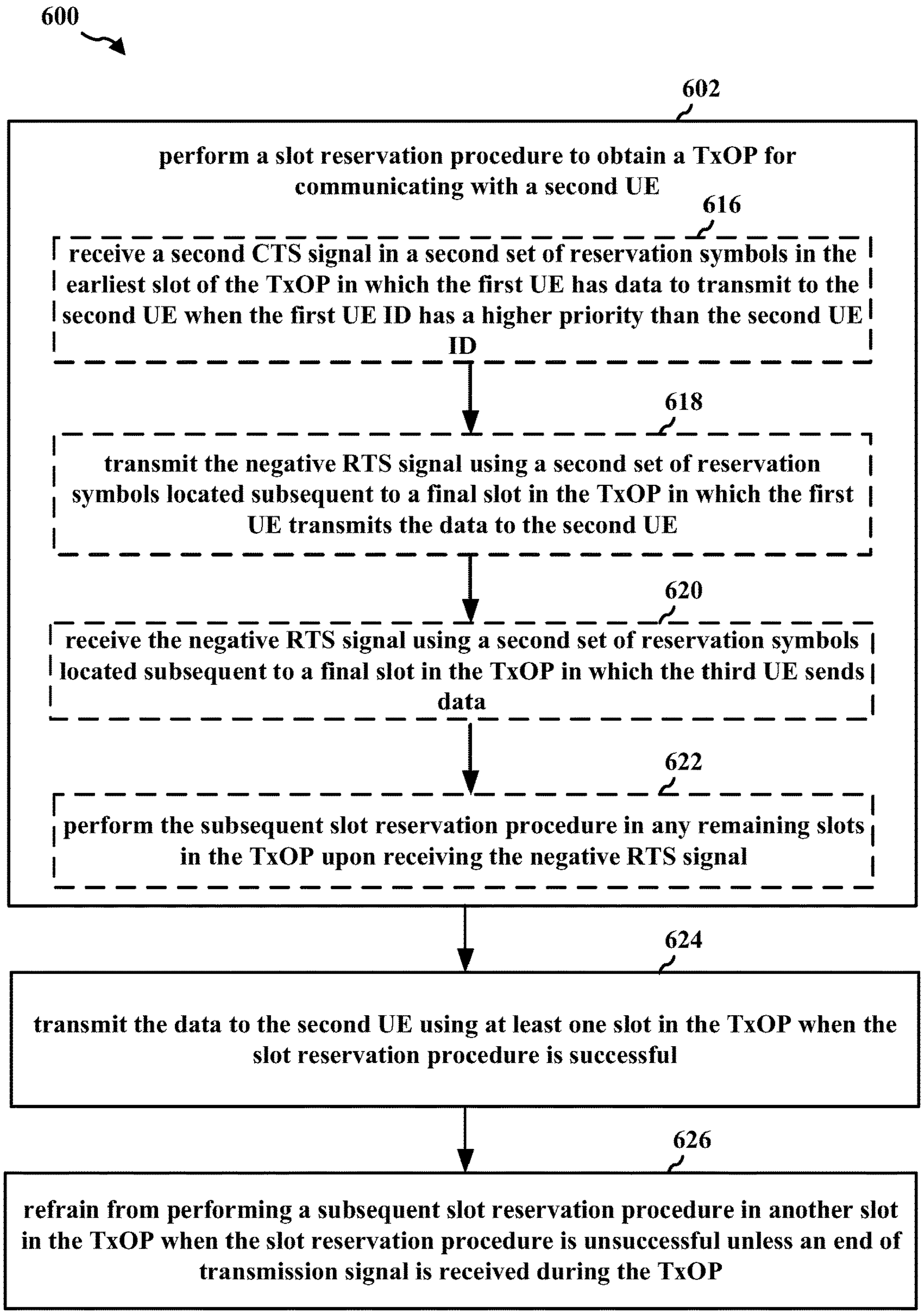

FIGS. 6A and 6B are a flowchart 600 of a method of wireless communication. The method may be performed by a first UE (e.g., UE 104, 350, UE A 502, UE B 504, UE C 506; the apparatus 702/702'; the processing system 814, which may include memory 360, 376 and which may be the entire UE or a component of the UE, such as TX processor 368 or 316, RX processor 356 or 370, or controller/processor 359 or 375). In FIGS. 6A and 6B, optional operations are indicated with dashed lines. The method improves directional communication between devices by helping to resolve conflicts for communication between devices Referring to FIG. 6A, at 602, the first UE may perform a slot reservation procedure to obtain a TxOP for communicating with a second UE. The slot reservation procedure may be performed by at least slot reservation component 706 in FIG. 7, for example. In certain aspects, the TxOP may include M contiguous slots, e.g., as illustrated in the example in FIG. 5B. The TxOP may correspond to a TxOP from among a plurality of TxOPs of a transmission schedule agreed upon by the first UE and the second UE, e.g., as described in connection with any of FIG. 5E, 5F, or 9. For example, at 601, the first UE may agree with the second UE to communicate using a set of TxOPs according to a transmission schedule. The first UE may correspond to Device A 902 or Device B 904 in the example of FIG. 9. Thus, the first UE may propose the transmission schedule that is then accepted by the second UE, or the first UE may accept a schedule proposed by the second UE. In certain other aspects, the slot reservation procedure may be performed in an earliest slot in the TxOP in which the first UE has data to send to the second UE. In certain other aspects, the entire duration of the TxOP is reserved for the first UE when the slot reservation procedure is successful. For example, FIG. 5D illustrates an example slot reservation procedure 526, 528 that may be performed by UE A 502 and UE C 506. The slot reservation procedure 526, 528 may not occur in slot 1, if no UEs have data to send in slot 1.

At 604, the first UE may perform the slot reservation procedure by transmitting a first RTS signal using a first set of reservation symbols in the earliest slot in the TxOP in which the first UE has data to transmit to the second UE. In certain aspects, the first RTS signal may include at least in part a first UE ID associated with the first UE. For example, referring to FIG. 5D, when UE A 502 and UE C 506 both send an RTS signal 532 at the start of slot 1, UE A 502 and UE C 506 may detect the RTS signal 532 transmitted by the other UE.

At 606, the first UE may perform the slot reservation procedure by determining whether a second RTS signal is transmitted by a third UE using the first set of reservation symbols in the earliest slot of the TxOP in which the first UE has data to transmit to the second UE. In certain aspects, the second RTS signal including at least in part a second UE ID associated with the third UE. In certain other aspects, the slot reservation procedure is successful when the second RTS signal is not transmitted by the third UE during the first set of reservation symbols. In certain other aspects, the first RTS signal may indicate in which of the M contiguous slots of the TxOP data will be transmitted by the first UE. In certain other aspects, the second RTS signal may indicate in which of the M contiguous slots of the TxOP data will be transmitted by the third UE. For example, referring to FIG. 5D, when UE A 502 and UE C 506 both send an RTS signal 532 at the start of slot 1, UE A 502 and UE C 506 may detect the RTS signal 532 transmitted by the other UE. However, if UE C 506 does not transmit an RTS signal 532 in slot 1, UE A 502 may determine the slot reservation procedure is successful.

At 608, upon determining that second RTS signal is received from the third UE using the first set of reservation symbols, the first UE may perform the slot reservation procedure by determining whether a measured power level associated with the second RTS signal is greater than a threshold level. For example, referring to FIG. 5D, each of UE A 502 and UE C 502 may determine if the transmission power level of the detected RTS signal 532 is less than or equal to a threshold transmission power level. When the detected RTS signal 532 is less than or equal to the threshold power level, both UE A 502 and UE C 506 may obtain the same TxOP and may transmit data 536 using the second set of symbols 522 because the transmission power of the interfering transmission may low enough to cause minimal or no interference to the other transmission. Otherwise, when the detected RTS signal 532 is greater than the threshold power level, UE A 502 and UE C 506 may determine which UE has a higher priority in order to determine which UE obtains the TxOP 512.

At 610, upon determining that the measured power level associated with the second RTS signal received from the third UE is greater than or equal to the threshold level, the first UE may perform the slot reservation procedure by determining whether the first UE ID associated with the first UE has a higher priority than the second UE ID associated with the third UE. In certain aspects, the slot reservation procedure may be successful when the first UE ID has a higher priority than the second UE ID. In certain other aspects, the slot reservation procedure may be unsuccessful when the first UE ID has a lower priority than the second UE ID. For example, referring to FIG. 5D, when UE A 502 and UE C 506 both send an RTS signal 532 at the start of slot 1, UE A 502 and UE C 506 may detect the other RTS signal 532 is above a threshold power level and determine which UE has a higher priority. In certain configurations, the RTS signal 532 may include one or more of a UE ID of the transmitting UE and/or an indication of which slots the UE intends to send data 536. The priority determination may by comparing the UE IDs to, e.g., a look-up table that includes a prioritized list of neighbor UEs.

At 612, the first UE may perform the slot reservation procedure by transmitting a first CTS signal using a second set of reservation symbols in the earliest slot of the TxOP in which the first UE has data to send to the second UE upon determining that the first UE ID has a lower priority than the second UE ID. For example, when UE A 502 has a higher priority as in the example depicted in FIG. 5D, UE C 506 (e.g., the first UE) may transmit a CTS signal 534, and UE A 502 (e.g., the third UE) may refrain from sending a CTS signal.

At 614, the first UE may perform the slot reservation procedure by refraining from sending the first CTS signal to the third UE upon determining that the first UE ID has a higher priority than the second UE ID. For example, when UE A 502 has a higher priority as in the example depicted in FIG. 5D, UE C 506 may transmit a CTS signal 534, and UE A 502 (e.g., the first UE) may refrain from sending a CTS signal.

Referring to FIG. 6B, at 616, the first UE may perform the slot reservation procedure by receiving a second CTS signal in a second set of reservation symbols in the earliest slot of the TxOP in which the first UE has data to transmit to the second UE when the first UE ID has a higher priority than the second UE ID. For example, when UE A 502 has a higher priority as in the example depicted in FIG. 5D, UE A 502 (e.g., the first UE) may receive a CTS signal 534 from UE C 506 (e.g., the third UE).

If the first UE ID and the second UE ID are associated with a same priority level, the slot reservation procedure may need to further select between the UEs (e.g., between UE A and UE C). As one example, the UE having a higher UE ID value may be selected. Thus, the method may prioritize, or otherwise select, the UE having a higher UE ID value when both UE IDs are associated with a same priority level.

At 618, when the first slot reservation procedure is successful, the first UE may perform the slot reservation procedure by transmitting the end of transmission signal (e.g., negative RTS signal) using a second set of reservation symbols located subsequent to a final slot in the TxOP in which the first UE transmits the data to the second UE. For example, referring to FIG. 5D, upon receiving an ACK 538 from UE B 504 related to the transmitted data 536, UE A 502 may send a negative RTS 540 to UE C 506 to indicate that no remaining slots (e.g., slot 3 and slot 4) will be used by UE A 502 in the TxOP 512.

At 620, when the slot reservation procedure is unsuccessful, the first UE may perform the slot reservation procedure by receiving the end of transmission signal (e.g., negative RTS signal) using a second set of reservation symbols located subsequent to a final slot in the TxOP in which the third UE sends data. For example, referring to FIG. 5D, UE C 506 (e.g., the first UE) may receive the negative RTS 540 in slot 3, and perform a subsequent slot reservation procedure by transmitting an RTS signal 532 using the slot reservation symbols at the start of slot 4. If UE C 506 receives a CTS signal 534 from UE A 502, then UE C 506 may transmit data 536 using the set of data symbols in slot 4.

At 622, the first UE may perform the slot reservation procedure by performing the subsequent slot reservation procedure in any remaining slots in the TxOP upon receiving the end of transmission signal (e.g., negative RTS signal). For example, referring to FIG. 5D, UE C 506 (e.g., the first UE) may receive the negative RTS 540 in slot 3, and perform a subsequent slot reservation procedure by transmitting an RTS signal 532 using the slot reservation symbols at the start of slot 4. If UE C 506 receives a CTS signal 534 from UE A 502, then UE C 506 may transmit data 536 using the set of data symbols in slot 4.

At 624, the first UE may transmit the data to the second UE using at least one slot in the TxOP when the slot reservation procedure is successful. For example, the transmission component 716 in FIG. 7 may be configured to transmit the data to the second UE when the lost reservation procedure is successful. In certain aspects, all remaining slots in the TxOP may be reserved for the first UE when the slot reservation procedure is successful. In certain configurations, the data may be transmitted using two or more contiguous slots of the M contiguous slots in the TxOP. In certain other configurations, the data may be transmitted using two or more non-contiguous slots of the M contiguous slots in the TxOP. For example, referring to FIG. 5D, an entire duration of the TxOP 512 may be reserved for UE A 502 when the slot reservation procedure is successful. In certain other implementations, data 536 may be transmitted to UE B 504 using two or more contiguous slots (e.g., slot 1 and slot 2 in FIG. 5D) in the TxOP 512. In an implementation not illustrated in FIG. 5D, the data 536 may be transmitted to UE B 504 using two or more non-contiguous slots (e.g., slot 1 and slot 3) in the TxOP 512.

At 626, the first UE may refrain from performing a subsequent slot reservation procedure in another slot in the TxOP when the slot reservation procedure is unsuccessful unless an end of transmission signal (e.g., a negative RTS signal) is received during the TxOP. For example, transmission component 716 in FIG. 7 may be configured to refrain from performing the subsequent slot reservation procedure in this manner. For example, referring to FIG. 5D, UE C 506 may refrain from performing a subsequent slot reservation procedure until the next TxOP when the slot reservation procedure in slot 1 is unsuccessful unless a negative RTS/CTS is received from UE A 502.

Figure 7:
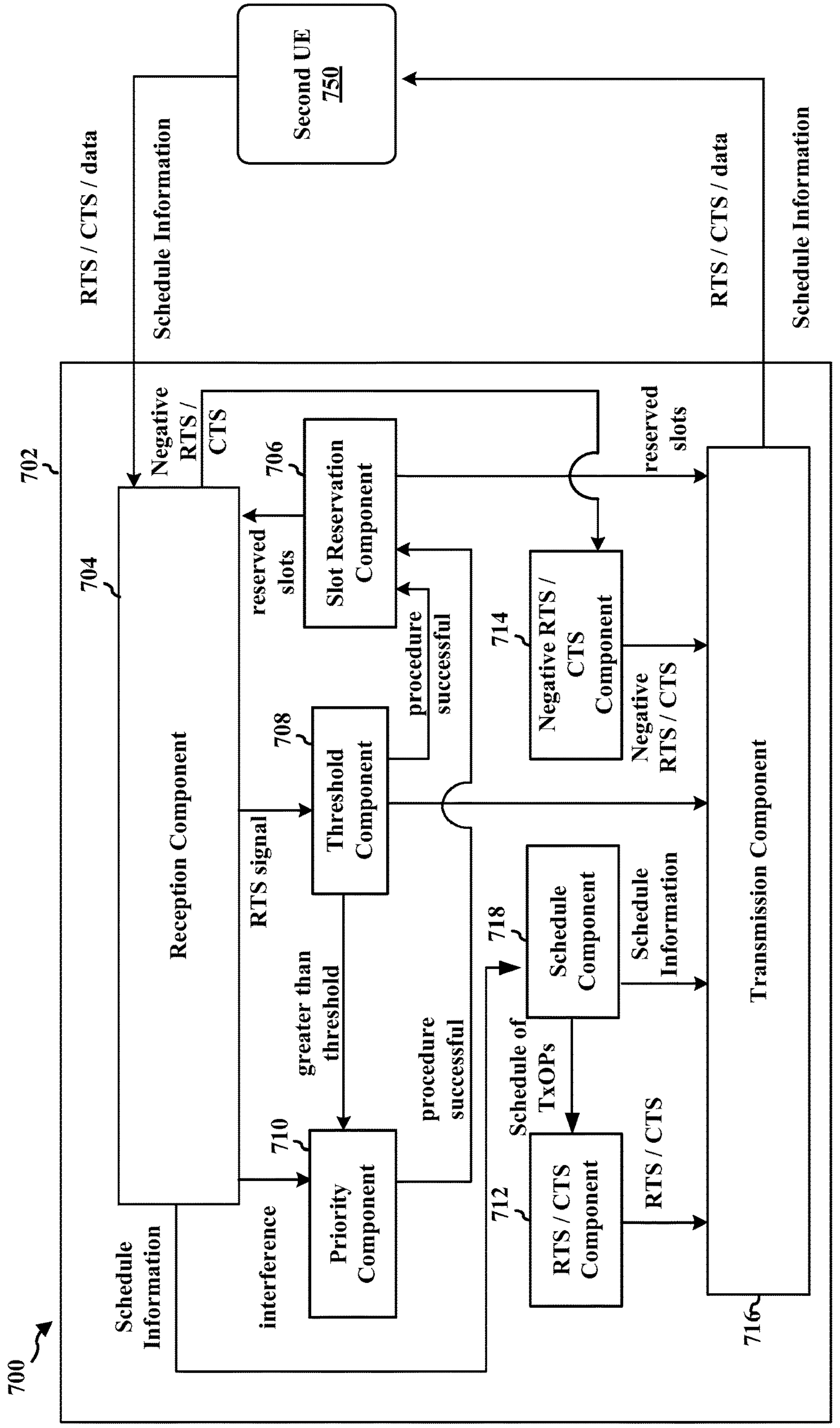
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus 702 may be a first UE (e.g., UE 104, 350, UE A 502, UE B 504, UE C 506, the apparatus 702') in communication with a second UE (e.g., UE 104, 350, UE A 502, UE B 504, UE C 506). The apparatus 702 may include a reception component 704, a slot reservation component 706, a threshold component 708, a priority component 710, an RTS/CTS component 712, a negative RTS/CTS component 714, a transmission component 716, and a schedule component 718.

One or more of the slot reservation component 706, the threshold component 708, the priority component 710, the RTS/CTS component 712, and/or the negative RTS/CTS component 714 may perform a slot reservation procedure to obtain a TxOP for communicating with another UE (not shown). In certain aspects, the TxOP may include M contiguous slots. The schedule component 718 may be configured to negotiate a transmission schedule of TxOPs with the second UE, e.g., as described in connection with FIG. 5E, 5F, or 9. In certain other aspects, the slot reservation procedure may be performed in an earliest slot in the TxOP in which the first UE has data to send to the second UE. In certain other aspects, the entire duration of the TxOP is reserved for the first UE when the slot reservation procedure is successful.

The RTS/CTS component 712 may be configured to generate an RTS signal that is sent to the transmission component 716 when the apparatus 702 has data to send to the second UE 750. The transmission component 716 may be configured to perform the slot reservation procedure by transmitting a first RTS signal using a first set of reservation symbols in the earliest slot in the TxOP in which the first UE has data to transmit to the second UE. In certain aspects, the first RTS signal may include at least in part a first UE ID associated with the first UE.

The reception component 704 may be configured to receive an RTS signal from the second UE 750, and send the RTS signal to the RTS/CTS component 712 and/or threshold component 708. The RTS/CTS component 712 may be configured to perform the slot reservation procedure by determining whether a second RTS signal is transmitted by the second UE 750 (e.g., a third UE) using the first set of reservation symbols in the earliest slot of the TxOP in which the first UE has data to transmit to the second UE. In certain aspects, the second RTS signal including at least in part a second UE ID associated with the third UE. In certain other aspects, the slot reservation procedure is successful when the second RTS signal is not transmitted by the third UE during the first set of reservation symbols. In certain other aspects, the first RTS signal may indicate in which of the M contiguous slots of the TxOP data will be transmitted by the first UE. In certain other aspects, the second RTS signal may indicate in which of the M contiguous slots of the TxOP data will be transmitted by the third UE.

Upon determining that second RTS signal is transmitted by the second UE 750 using the first set of reservation symbols, the RTS/CTS component 712 may send a signal to threshold component 708.

The threshold component 708 may be configured to perform the slot reservation procedure by determining whether a measured power level associated with the second RTS signal is greater than a threshold level. Upon determining that the measured power level associated with the second RTS signal transmitted by the second UE 750 is greater than or equal to the threshold level, the threshold component 708 may send a signal to the priority component 710.

The priority component 710 may be configured to perform the slot reservation procedure by determining whether the first UE ID associated with the apparatus 702 has a higher priority than the second UE ID associated with the second UE 750. In certain aspects, the slot reservation procedure may be successful when the first UE ID has a higher priority than the second UE ID. In certain other aspects, the slot reservation procedure may be unsuccessful when the first UE ID has a lower priority than the second UE ID. Upon determining that the apparatus 702 has a lower priority than the second UE 750, the priority component 710 may send a signal to the RTS/CTS component 712.

The RTS/CTS component 712 may be configured to perform the slot reservation procedure by sending a first CTS to the transmission component 716 upon determining that the first UE ID has a lower priority than the second UE ID. The transmission component 716 may be configured to perform the slot reservation procedure by transmitting a first CTS signal using a second set of reservation symbols in the earliest slot of the TxOP in which the first UE has data to send to the second UE 750.

The RTS/CTS component 712 may be configured to perform the slot reservation procedure by refraining from sending the first CTS signal to the second UE 750 upon determining that the first UE ID has a higher priority than the second UE ID.

The reception component 704 may be configured to perform the slot reservation procedure by receiving a second CTS signal in a second set of reservation symbols in the earliest slot of the TxOP in which the first UE has data to transmit to the second UE 750 when the first UE ID has a higher priority than the second UE ID. The reception component 704 may be configured to send the second CTS signal to the RTS/CTS component 712, and the RTS/CTS component 712 may be configured to send a signal to the slot reservation component 706 indicating the slot reservation procedure is successful.

When the first slot reservation procedure is successful, the slot reservation component 706 may send a signal to the negative RTS/CTS component 714 indicating that all the data has been transmitted and to send a negative RTS/CTS to the second UE 750. The negative RTS/CTS component 714 may perform the slot reservation procedure by transmitting the end of transmission signal (e.g., negative RTS signal) using a second set of reservation symbols located subsequent to a final slot in the TxOP in which the first UE transmits the data to the second UE 750 via the transmission component 716.

When the slot reservation procedure is unsuccessful, reception component 704 may perform the slot reservation procedure by receiving the end of transmission signal (e.g., negative RTS signal) using a second set of reservation symbols located subsequent to a final slot in the TxOP in which the third UE sends data, and sending the negative RTS signal to the negative RTS/CTS component 714. The negative RTS/CTS component 714 may send a signal to the RTS/CTS component 712 instructing the RTS/CTS component 712 to send a subsequent RTS in the next slot.

The slot reservation component 706, the RTS/CTS component 712, the reception component 704, and/or the transmission component 716 may be configured to perform the slot reservation procedure by performing the subsequent slot reservation procedure in any remaining slots in the TxOP upon receiving the end of transmission signal (e.g., negative RTS signal).

The transmission component 716 may be configured to transmit the data to another UE (not shown) using at least one slot in the TxOP when the slot reservation procedure is successful. In certain aspects, all remaining slots in the TxOP may be reserved for the first UE when the slot reservation procedure is successful. In certain configurations, the data may be transmitted using two or more contiguous slots of the M contiguous slots in the TxOP. In certain other configurations, the data may be transmitted using two or more non-contiguous slots of the M contiguous slots in the TxOP.

The slot reservation component 706, the RTS/CTS component, the reception component 704, and/or the transmission component 716 may be configured to refrain from performing a subsequent slot reservation procedure in another slot in the TxOP when the slot reservation procedure is unsuccessful unless an end of transmission signal (e.g., negative RTS signal) is received during the TxOP.

The apparatus 702 may include additional components that perform each of the blocks of the algorithm in the aforementioned flowcharts of FIGS. 6A and 6B. As such, each block in the aforementioned flowcharts of FIGS. 6A and 6B may be performed by a component and the apparatus 702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
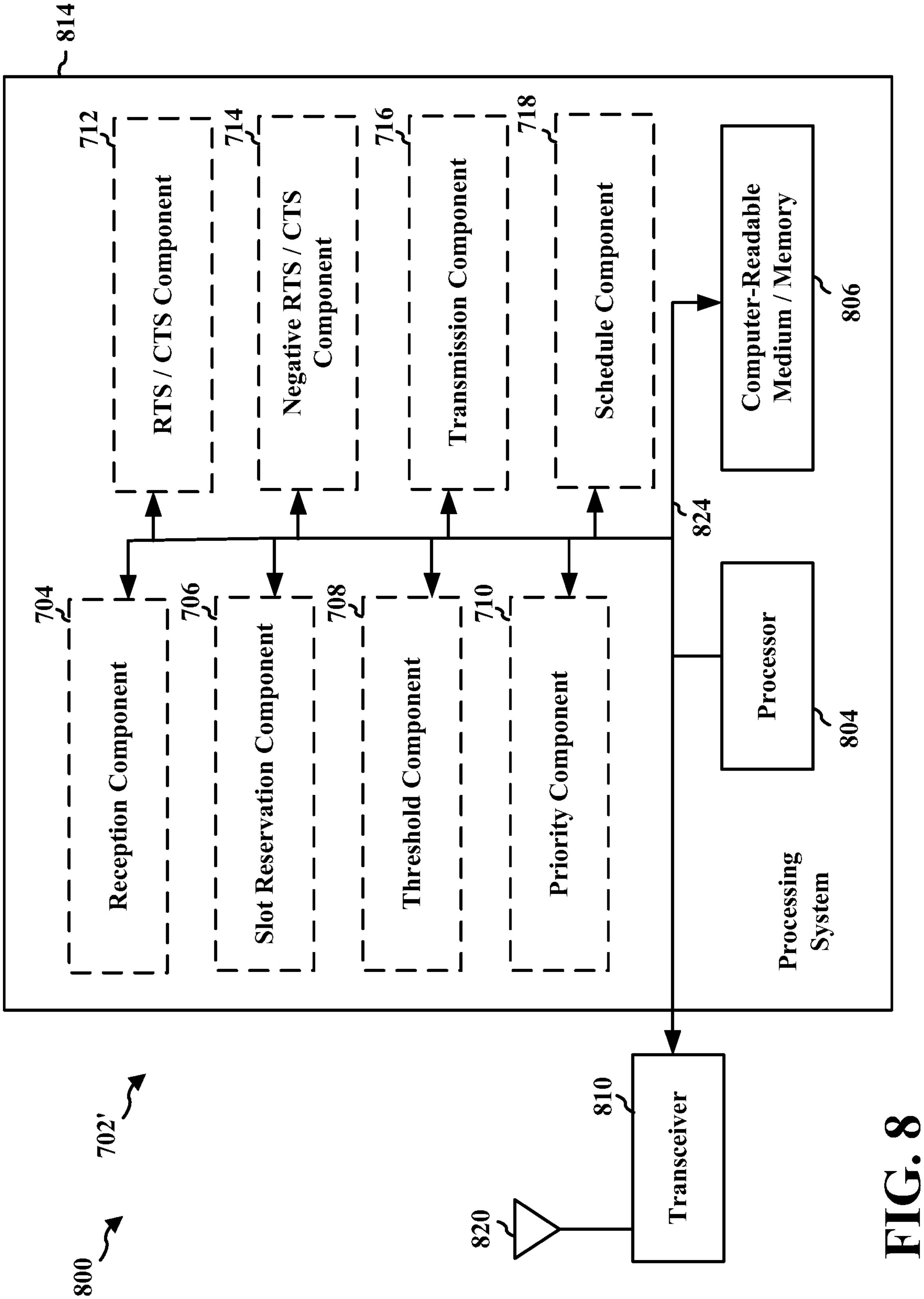
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 716, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. In an example, the processing system may comprise the entire device 350, e.g., such as an entire UE.

In certain configurations, the apparatus 702/702' for wireless communication may include means for performing a slot reservation procedure to obtain a TxOP for communicating with a second UE. In certain aspects, the TxOP may include M contiguous slots. In certain other aspects, the slot reservation procedure may be performed in an earliest slot in the TxOP in which the first UE has data to send to the second UE. In certain other aspects, the entire duration of the TxOP is reserved for the first UE when the slot reservation procedure is successful. In certain configurations, the means for performing the slot reservation procedure may be configured to transmit a first RTS signal using a first set of reservation symbols in the earliest slot in the TxOP in which the first UE has data to transmit to the second UE. In certain aspects, the first RTS signal may include at least in part a first UE ID associated with the first UE. In certain other configurations, the means for performing the slot reservation procedure may be configured to determine whether a second RTS signal is transmitted by a third UE using the first set of reservation symbols in the earliest slot of the TxOP in which the first UE has data to transmit to the second UE. In certain aspects, the second RTS signal including at least in part a second UE ID associated with the third UE. In certain other aspects, the slot reservation procedure is successful when the second RTS signal is not transmitted by the third UE during the first set of reservation symbols. In certain other aspects, the first RTS signal may indicate in which of the M contiguous slots of the TxOP data will be transmitted by the first UE. In certain other aspects, the second RTS signal may indicate in which of the M contiguous slots of the TxOP data will be transmitted by the third UE. In certain other configurations, the means for performing the slot reservation procedure may be configured to determine whether a measured power level associated with the second RTS signal is greater than a threshold level upon determining that second RTS signal is transmitted by the third UE using the first set of reservation symbols. In certain other configurations, the means for performing the slot reservation procedure may be configured to determine whether the first UE ID associated with the first UE has a higher priority than the second UE ID associated with the third UE upon determining that the measured power level associated with the second RTS signal transmitted by the third UE is greater than or equal to the threshold level. In certain aspects, the slot reservation procedure may be successful when the first UE ID has a higher priority than the second UE ID. In certain other aspects, the slot reservation procedure may be unsuccessful when the first UE ID has a lower priority than the second UE ID. In certain other configurations, the means for performing the slot reservation procedure may be configured to transmit a first CTS signal using a second set of reservation symbols in the earliest slot of the TxOP in which the first UE has data to send to the second UE upon determining that the first UE ID has a lower priority than the second UE ID. In certain other configurations, the means for performing the slot reservation procedure may be configured to refrain from sending the first CTS signal to the third UE upon determining that the first UE ID has a higher priority than the second UE ID. In certain other configurations, the means for performing the slot reservation procedure may be configured to receive a second CTS signal in a second set of reservation symbols in the earliest slot of the TxOP in which the first UE has data to transmit to the second UE when the first UE ID has a higher priority than the second UE ID. In certain other configurations, the means for performing the slot reservation procedure may be configured to transmit the end of transmission signal (e.g., negative RTS signal) using a second set of reservation symbols located subsequent to a final slot in the TxOP in which the first UE transmits the data to the second UE when the first slot reservation procedure is successful. In certain other configurations, the means for performing the slot reservation procedure may be configured to receive the end of transmission signal (e.g., negative RTS signal) using a second set of reservation symbols located subsequent to a final slot in the TxOP in which the third UE sends data when the slot reservation procedure is unsuccessful. In certain other configurations, the means for performing the slot reservation procedure may be configured to perform the subsequent slot reservation procedure in any remaining slots in the TxOP upon receiving the end of transmission signal (e.g., negative RTS signal). In certain configurations, the apparatus 702/702' for wireless communication may include means for transmitting the data to the second UE using at least one slot in the TxOP when the slot reservation procedure is successful. In certain aspects, all remaining slots in the TxOP may be reserved for the first UE when the slot reservation procedure is successful. In certain configurations, the data may be transmitted using two or more contiguous slots of the M contiguous slots in the TxOP. In certain other configurations, the data may be transmitted using two or more non-contiguous slots of the M contiguous slots in the TxOP. In certain configurations, the apparatus 702/702' for wireless communication may include means for refrain from performing a subsequent slot reservation procedure in another slot in the TxOP when the slot reservation procedure is unsuccessful unless an end of transmission signal (e.g., negative RTS signal) is received during the TxOP. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first user equipment (UE), comprising:

performing, in an earliest slot of a transmission opportunity (TxOP) in which the first UE has data to send to a second UE, a TxOP reservation procedure to reserve, for communicating with the second UE, the TxOP including a plurality of contiguous slots, wherein the performing the TxOP reservation procedure for the TxOP includes:

transmitting a first request-to-send (RTS) signal using a first set of reservation symbols in the earliest slot in the TxOP in which the first UE has the data to transmit to the second UE, the first RTS signal including at least in part a first UE identification (ID) associated with the first UE; and determining whether a second RTS signal is transmitted by a third UE using the first set of reservation symbols in the earliest slot of the TxOP in which the first UE has the data to transmit to the second UE, the second RTS signal including at least in part a second UE ID associated with the third UE, wherein when the first UE ID and the second UE ID are associated with a same priority, the TxOP reservation procedure includes prioritizing a UE having a higher UE ID value;

transmitting the data to the second UE using at least one slot in the TxOP when the TxOP reservation procedure is successful, all remaining slots in the TxOP being reserved for the first UE when the TxOP reservation procedure is successful; and refraining from performing a subsequent TxOP reservation procedure in another slot in the TxOP when the TxOP reservation procedure is unsuccessful unless an end of transmission signal is received during the TxOP.

2. The method of claim 1, wherein the TxOP reservation procedure is successful when the second RTS signal is not detected during the first set of reservation symbols.

3. The method of claim 2, wherein upon determining that the second RTS signal is transmitted by the third UE using the first set of reservation symbols, the performing the TxOP reservation procedure for the TxOP further comprises:

determining whether a measured power level associated with the second RTS signal is greater than a threshold level, wherein the TxOP reservation procedure is successful when the measured power level associated with the second RTS signal received from the third UE is less than the threshold level.

4. The method of claim 3, wherein upon determining that the measured power level associated with the second RTS signal transmitted by the third UE is greater than or equal to the threshold level, the performing the TxOP reservation procedure for the TxOP further comprises:

determining whether the first UE ID associated with the first UE has the higher priority than the second UE ID associated with the third UE, wherein the TxOP reservation procedure is successful when the first UE ID has the higher priority than the second UE ID, and wherein the TxOP reservation procedure is unsuccessful when the first UE ID has a lower priority than the second UE ID.

5. The method of claim 2, wherein the first RTS signal indicates in which of the plurality of contiguous slots of the TxOP the data will be transmitted by the first UE, or wherein the second RTS signal indicates in which of the plurality of contiguous slots of the TxOP second data will be transmitted by the third UE.

6. The method of claim 1, wherein when the TxOP reservation procedure is successful, the performing the TxOP reservation procedure for the TxOP further comprises:

transmitting the end of transmission signal using a second set of reservation symbols located subsequent to a final slot in the TxOP in which the first UE transmits the data to the second UE.

7. The method of claim 1, wherein an entire duration of the TxOP is reserved for the first UE when the TxOP reservation procedure is successful.

8. The method of claim 1, wherein when the TxOP reservation procedure is unsuccessful, the performing the TxOP reservation procedure for the TxOP further comprises:

receiving the end of transmission signal using a second set of reservation symbols located subsequent to a final slot in the TxOP in which a third UE sends second data; and performing the subsequent TxOP reservation procedure in any remaining slots in the TxOP upon receiving the end of transmission signal.

9. A method of wireless communication of a first user equipment (UE), comprising:

performing, in an earliest slot of a transmission opportunity (TxOP) in which the first UE has data to send to a second UE, a TxOP reservation procedure to reserve, for communicating with the second UE, the TxOP including a plurality of contiguous slots, wherein the performing the TxOP reservation procedure for the TxOP includes:

transmitting a first request-to-send (RTS) signal using a first set of reservation symbols in the earliest slot in the TxOP in which the first UE has the data to transmit to the second UE, the first RTS signal including at least in part a first UE identification (ID) associated with the first UE; and receiving a second RTS signal transmitted by a third UE using the first set of reservation symbols in the earliest slot of the TxOP in which the first UE has the data to transmit to the second UE, the second RTS signal including at least in part a second UE ID associated with the third UE; and determining whether the first UE ID associated with the first UE has the higher priority than the second UE ID associated with the third UE, wherein the TxOP reservation procedure is successful when the first UE ID has a higher priority than the second UE ID, wherein the TxOP reservation procedure is unsuccessful when the first UE ID has a lower priority than the second UE ID;

transmitting a first clear-to-send (CTS) signal using a second set of reservation symbols in the earliest slot of the TxOP in which the first UE has the data to send to the second UE upon determining that the first UE ID has the lower priority than the second UE ID; and refraining from sending the first CTS signal to the third UE upon determining that the first UE ID has the higher priority than the second UE ID.

10. The method of claim 9, wherein the performing the TxOP reservation procedure for the TxOP further comprises:

receiving a second CTS signal in the second set of reservation symbols in the earliest slot of the TxOP in which the first UE has the data to transmit to the second UE when the first UE ID has the higher priority than the second UE ID.

11. The method of claim 10, wherein the data is transmitted using two or more contiguous slots of the plurality of contiguous slots in the TxOP.

12. The method of claim 10, wherein the data is transmitted using two or more non-contiguous slots of the plurality of contiguous slots in the TxOP.

13. An apparatus for wireless communication of a first user equipment (UE), comprising:

means for performing, in an earliest slot of a transmission opportunity (TxOP) in which the first UE has data to send to a second UE, a TxOP reservation procedure to reserve, for communicating with the second UE, the TxOP including a plurality of contiguous slots, wherein the means for performing the TxOP reservation procedure for the TxOP is configured to transmit a first request-to-send (RTS) signal using a first set of reservation symbols in the earliest slot in the TxOP in which the first UE has the data to transmit to the second UE, the first RTS signal including at least in part a first UE identification (ID) associated with the first UE, and is configured to determine whether a second RTS signal is transmitted by a third UE using the first set of reservation symbols in the earliest slot of the TxOP in which the first UE has the data to transmit to the second UE, the second RTS signal including at least in part a second UE ID associated with the third UE, wherein when the first UE ID and the second UE ID are associated with a same priority, the means for performing are further configured to prioritize a UE having a higher UE ID value;

means for transmitting the data to the second UE using at least one slot in the TxOP when the TxOP reservation procedure is successful, all remaining slots in the TxOP being reserved for the first UE when the TxOP reservation procedure is successful; and means for refraining from performing a subsequent TxOP reservation procedure in another slot in the TxOP when the TxOP reservation procedure is unsuccessful unless an end of transmission signal is received during the TxOP.

14. The apparatus of claim 13, wherein the TxOP reservation procedure is successful when the second RTS signal is not detected during the first set of reservation symbols.

15. The apparatus of claim 14, wherein upon determining that the second RTS signal is transmitted by the third UE using the first set of reservation symbols, the means for performing the TxOP reservation procedure for the TxOP is further configured to:

determine whether a measured power level associated with the second RTS signal is greater than a threshold level, wherein the TxOP reservation procedure is successful when the measured power level associated with the second RTS signal transmitted by the third UE is less than the threshold level.

16. The apparatus of claim 15, wherein upon determining that the measured power level associated with the second RTS signal transmitted by the third UE is greater than or equal to the threshold level, the means for performing the TxOP reservation procedure for the TxOP is further configured to:

determine whether the first UE ID associated with the first UE has a higher priority than the second UE ID associated with the third UE, wherein the TxOP reservation procedure is successful when the first UE ID has the higher priority than the second UE ID, wherein the TxOP reservation procedure is unsuccessful when the first UE ID has a lower priority than the second UE ID.

17. The apparatus of claim 14, wherein the first RTS signal indicates in which of the plurality of contiguous slots of the TxOP the data will be transmitted by the first UE, or wherein the second RTS signal indicates in which of the plurality of contiguous slots of the TxOP second data will be transmitted by the third UE.

18. The apparatus of claim 13, wherein the means for performing the TxOP reservation procedure for the TxOP is configured to transmit the end of transmission signal using a second set of reservation symbols located subsequent to a first, final slot in the TxOP in which the first UE transmits the data to the second UE, when the TxOP reservation procedure is successful, and wherein the means for performing the TxOP reservation procedure for the TxOP is configured to receive the end of transmission signal using a third set of reservation symbols located subsequent to a second, final slot in the TxOP in which a third UE sends second data and perform the subsequent TxOP reservation procedure in any remaining slots in the TxOP upon receiving the end of transmission signal, when the TxOP reservation procedure is unsuccessful.

19. An apparatus for wireless communication of a first user equipment (UE), comprising:

a memory; and at least one processor coupled to the memory and configured to:

perform, in an earliest slot of a transmission opportunity (TxOP) in which the first UE has data to send to a second UE, a TxOP reservation procedure to reserve, for communicating with the second UE, the TxOP including a plurality of contiguous slots;

transmit a first request-to-send (RTS) signal using a first set of reservation symbols in the earliest slot in the TxOP in which the first UE has the data to transmit to the second UE, the first RTS signal including at least in part a first UE identification (ID) associated with the first UE; and determine whether a second RTS signal is transmitted by a third UE using the first set of reservation symbols in the earliest slot of the TxOP in which the first UE has the data to transmit to the second UE, the second RTS signal including at least in part a second UE ID associated with the third UE, wherein when the first UE ID and the second UE ID are associated with a same priority, the TxOP reservation procedure includes prioritizing a UE having a higher UE ID value;

transmit the data to the second UE using at least one slot in the TxOP when the TxOP reservation procedure is successful, all remaining slots in the TxOP being reserved for the first UE when the TxOP reservation procedure is successful; and refrain from performing a subsequent TxOP reservation procedure in another slot in the TxOP when the TxOP reservation procedure is unsuccessful unless an end of transmission signal is received during the TxOP.

20. The apparatus of claim 19, wherein the TxOP reservation procedure is successful when the second RTS signal is not detected during the first set of reservation symbols.

21. The apparatus of claim 20, wherein upon determining that the second RTS signal is transmitted by the third UE using the first set of reservation symbols, the at least one processor is further configured to:

determine whether a measured power level associated with the second RTS signal is greater than a threshold level, wherein the TxOP reservation procedure is successful when the measured power level associated with the second RTS signal transmitted by the third UE is less than the threshold level.

22. The apparatus of claim 21, wherein upon determining that the measured power level associated with the second RTS signal transmitted by the third UE is greater than or equal to the threshold level, the at least one processor is further configured to:

determine whether the first UE ID associated with the first UE has a higher priority than the second UE ID associated with the third UE, wherein the TxOP reservation procedure is successful when the first UE ID has the higher priority than the second UE ID, and wherein the TxOP reservation procedure is unsuccessful when the first UE ID has a lower priority than the second UE ID.

23. The apparatus of claim 19, wherein the at least one processor is configured to transmit the end of transmission signal using a second set of reservation symbols located subsequent to a first, final slot in the TxOP in which the first UE transmits the data to the second UE, when the TxOP reservation procedure is successful, and wherein the at least one processor is configured to receive the end of transmission signal using a third set of reservation symbols located subsequent to a second, final slot in the TxOP in which a third UE sends second data and perform the subsequent TxOP reservation procedure in any remaining slots in the TxOP upon receiving the end of transmission signal, when the TxOP reservation procedure is unsuccessful.

24. An apparatus for wireless communication of a first user equipment (UE), comprising:

a memory; and at least one processor coupled to the memory and configured to:

perform, in an earliest slot of a transmission opportunity (TxOP) in which the first UE has data to send to a second UE, a TxOP reservation procedure to reserve, for communicating with the second UE, the TxOP including a plurality of contiguous slots;

transmit a first request-to-send (RTS) signal using a first set of reservation symbols in the earliest slot in the TxOP in which the first UE has the data to transmit to the second UE, the first RTS signal including at least in part a first UE identification (ID) associated with the first UE; and receive a second RTS signal transmitted by a third UE using the first set of reservation symbols in the earliest slot of the TxOP in which the first UE has the data to transmit to the second UE, the second RTS signal including at least in part a second UE ID associated with the third UE;

determine whether the first UE ID associated with the first UE has the higher priority than the second UE ID associated with the third UE, wherein the TxOP reservation procedure is successful when the first UE ID has a higher priority than the second UE ID, wherein the TxOP reservation procedure is unsuccessful when the first UE ID has a lower priority than the second UE ID;

transmit a first clear-to-send (CTS) signal using a second set of reservation symbols in the earliest slot of the TxOP in which the first UE has the data to send to the second UE upon determining that the first UE ID has the lower priority than the second UE ID; and refrain from sending the first CTS signal to the third UE upon determining that the first UE ID has the higher priority than the second UE ID.

25. The apparatus of claim 24, wherein the at least one processor is configured to:

receive a second CTS signal in the second set of reservation symbols in the earliest slot of the TxOP in which the first UE has the data to transmit to the second UE when the first UE ID has the higher priority than the second UE ID.

26. A non-transitory computer-readable medium storing computer code executable by a first user equipment (UE) to cause the first UE to:

perform, in an earliest slot of a transmission opportunity (TxOP) in which the first UE has data to send to a second UE, a TxOP reservation procedure to reserve, for communicating with the second UE, the TxOP including a plurality of contiguous slots;

transmit a first request-to-send (RTS) signal using a first set of reservation symbols in the earliest slot in the TxOP in which the first UE has the data to transmit to the second UE, the first RTS signal including at least in part a first UE identification (ID) associated with the first UE; and determine whether a second RTS signal is transmitted by a third UE using the first set of reservation symbols in the earliest slot of the TxOP in which the first UE has the data to transmit to the second UE, the second RTS signal including at least in part a second UE ID associated with the third UE, wherein when the first UE ID and the second UE ID are associated with a same priority, the TxOP reservation procedure includes prioritizing a UE having a higher UE ID value;

transmit the data to the second UE using at least one slot in the TxOP when the TxOP reservation procedure is successful, all remaining slots in the TxOP being reserved for the first UE when the TxOP reservation procedure is successful; and refrain from performing a subsequent TxOP reservation procedure in another slot in the TxOP when the TxOP reservation procedure is unsuccessful unless an end of transmission signal is received during the TxOP.

* * * * *